United States Patent
Faccin et al.

(10) Patent No.: US 11,611,865 B2
(45) Date of Patent: Mar. 21, 2023

(54) MOBILITY BETWEEN AREAS WITH HETEROGENEOUS NETWORK SLICES

(71) Applicant: QUALCOMM Incorporated, San Diego, CA (US)

(72) Inventors: Stefano Faccin, San Ysidro, CA (US); Haris Zisimopoulos, London (GB); Miguel Griot, La Jolla, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/079,714

(22) Filed: Oct. 26, 2020

(65) Prior Publication Data

US 2021/0067944 A1 Mar. 4, 2021

Related U.S. Application Data

(63) Continuation of application No. 15/927,696, filed on Mar. 21, 2018, now Pat. No. 10,820,185.

(30) Foreign Application Priority Data

May 8, 2017 (GR) .............................. 20170100207

(51) Int. Cl.
*H04W 8/06* (2009.01)
*H04W 76/28* (2018.01)
(Continued)

(52) U.S. Cl.
CPC ............ *H04W 8/06* (2013.01); *H04W 48/18* (2013.01); *H04W 76/27* (2018.02); *H04W 76/28* (2018.02);
(Continued)

(58) Field of Classification Search
CPC ....... H04W 8/06; H04W 76/28; H04W 76/27; H04W 48/18; H04W 8/183; H04W 36/12; H04W 60/02
See application file for complete search history.

(56) References Cited

U.S. PATENT DOCUMENTS 10,142,994 B2  11/2018  Lee et al.
10,264,506 B2   4/2019  Faccin et al.
(Continued)

FOREIGN PATENT DOCUMENTS

CA  3057401 A1   9/2018
CA  3057870 A1  10/2018
(Continued)

OTHER PUBLICATIONS

"3rd Generation Partnership Project; Technical Specification Group Services and System Aspects; Procedures for the 5G System; Stage 2 (Release 15)", 3GPP Standard; Technical Specification; 3GPP TS 23.502, 3rd Generation Partnership Project (3GPP), Mobile Competence Centre; 650, Route Des Lucioles ; F-06921 Sophia-Antipolis Cedex ; France, vol. SA WG2, No. V0.3.0, Apr. 20, 2017 (Apr. 20, 2017), XP051298172, pp. 1-115.
(Continued)

*Primary Examiner* — Eric Myers
(74) *Attorney, Agent, or Firm* — Patterson + Sheridan, L.L.P.

(57) ABSTRACT

Certain aspects of the present disclosure relate to methods and apparatus for handling mobility between areas with heterogeneous network slices in wireless communications systems operating according to new radio (NR) technologies. An exemplary method that may be performed by a UE includes receiving an indication that a network slice is not available, entering a connection management idle (CM-IDLE) state, and initiating a registration procedure with an
(Continued)

access and mobility management function (AMF) subsequent to entering the CM-IDLE state.

36 Claims, 14 Drawing Sheets

(51) Int. Cl.
  *H04W 48/18* (2009.01)
  *H04W 76/27* (2018.01)
  *H04W 60/02* (2009.01)
  *H04W 8/18* (2009.01)
  *H04W 36/12* (2009.01)
(52) U.S. Cl.
  CPC ............ *H04W 8/183* (2013.01); *H04W 36/12* (2013.01); *H04W 60/02* (2013.01)

(56) References Cited

U.S. PATENT DOCUMENTS

| | | |
|---|---|---|
| 10,820,185 B2 | 10/2020 | Faccin et al. |
| 2014/0086177 A1 | 3/2014 | Adjakple et al. |
| 2016/0156513 A1 | 6/2016 | Zhang et al. |
| 2017/0086118 A1 | 3/2017 | Vrzic |
| 2017/0303259 A1 | 10/2017 | Lee et al. |
| 2017/0332421 A1 | 11/2017 | Sternberg et al. |
| 2018/0088201 A1 | 3/2018 | Fujio |
| 2018/0227871 A1 | 8/2018 | Singh et al. |
| 2018/0227873 A1 | 8/2018 | Vrzic et al. |
| 2018/0227978 A1 | 8/2018 | Keller et al. |
| 2018/0270744 A1 | 9/2018 | Griot et al. |
| 2018/0332523 A1 | 11/2018 | Faccin et al. |
| 2019/0037636 A1 | 1/2019 | Kim et al. |
| 2019/0124508 A1 | 4/2019 | Watfa et al. |
| 2019/0239136 A1 | 8/2019 | Faccin et al. |
| 2019/0261233 A1 | 8/2019 | Duan et al. |
| 2019/0357130 A1 | 11/2019 | Garcia Azorero et al. |
| 2020/0008047 A1 | 1/2020 | Castellanos Zamora et al. |
| 2020/0059989 A1 | 2/2020 | Velev et al. |
| 2020/0077327 A1 | 3/2020 | Duan et al. |
| 2021/0227444 A1 | 7/2021 | Faccin et al. |

FOREIGN PATENT DOCUMENTS

| | | |
|---|---|---|
| EP | 3358887 A1 | 8/2018 |
| EP | 3416429 B1 | 8/2020 |
| EP | 3537768 B1 | 6/2021 |
| JP | 2020057835 A | 4/2020 |
| KR | 20170119296 A | 10/2017 |
| WO | WO-2017044153 A1 | 3/2017 |
| WO | WO-2017058067 A1 | 4/2017 |
| WO | WO-2017096606 A1 | 6/2017 |
| WO | WO-2017098441 A1 | 6/2017 |
| WO | 2017135860 A1 | 8/2017 |
| WO | WO-2018034924 A1 | 2/2018 |
| WO | 2018082221 A1 | 5/2018 |
| WO | 2018126461 A1 | 7/2018 |
| WO | WO-2018121880 A1 | 7/2018 |
| WO | 2018153470 A1 | 8/2018 |
| WO | WO-2018145727 A1 | 8/2018 |
| WO | 2018176425 A1 | 10/2018 |
| WO | 2018205131 A1 | 11/2018 |
| WO | 2018205150 A1 | 11/2018 |
| WO | WO-2018202274 A1 | 11/2018 |
| WO | WO-2018205147 A1 | 11/2018 |

OTHER PUBLICATIONS

"3rd Generation Partnership Project; Technical Specification Group Services and System Aspects; System Architecture for the 5G System; Stage 2 (Release 15)", 3GPP Standard; Technical Specification 3GPP TS 23.501, 3rd Generation Partnership Project (3GPP), Mobile Competence Centre; 650, Route Des Lucioles; F-06921 Sophia-Antipolis Cedex; France, vol. SA WG2, No. V0.4.0, Apr. 20, 2017 (Apr. 20, 2017), XP051298169, pp. 1-124.
"3rd Generation Partnership Project; Technical Specification Group Services and System Aspects; System Architecture for the 5G System; Stage 2 (Release 15)", 3GPP Standard; Technical Specification; 3GPP TS 23.501, 3rd Generation Partnership Project (3GPP), Mobile Competence Centre 650, Route Des Lucioles; F-06921 Sophia-Antipolis Cedex; France, vol. SA WG2, No. V15.0.0, Dec. 22, 2017 (Dec. 22, 2017), XP051392101, pp. 1-181 p. 46, p. 50-p. 54, p. 81-p. 97.
Catt: "Discussion on Slice Mobility Issue", 3GPP Draft; R3-180199 Slice Mobility, 3rd Generation Partnership Project (3GPP), Mobile Competence Centre; 650, Route Des Lucioles; F-06921 Sophia-Antipolis Cedex; France, vol. RAN WG3, No. Sophia Antipolis, France; Jan. 22, 2018-Jan. 26, 2018, Jan. 13, 2018 (Jan. 13, 2018), XP051387519, 5 Pages, Retrieved from the Internet: URL:http://www.3gpp.org/tsg_ran/WG3 lu/TSG_R3_AHGs/R3-AH-1801/Docs/R3-180199 slicemobility.doc [retrieved on Jan. 13, 2018].
Ericsson: "Further Mobility Procedures Descriptions for NW Slicing", 3GPP Draft; R3-170679 Slice Mobility Idle, 3rd Generation Partnership Project (3GPP), Mobile Competence Centre; 650, Route Des Lucioles; F-06921 Sophia-Antipolis Cedex; France vol. RAN WG3, No. Athens, Greece; Feb. 13, 2017-Feb. 17, 2017, Feb. 12, 2017 (Feb. 12, 2017), XP051213258, 3 Pages, Retrieved from the Internet: URL:http://www.3gpp.org/ftp/Meetings 3GPP_SYNC/RAN3/Docs/ [retrieved Feb. 12, 2017].
Ericsson: "Slice and AMF Selection at HO Procedure," 3GPP Draft, S2-178552 Handover and Slicing, 3rd Generation Partnership-Project (3GPP), Mobile Competence Centre, 650, Route Des Lucioles, F-06921 Sophia-Antipolis Cedex, France, vol. SA WG2, No, Reno, Nevada, USA, Nov. 27, 2017-Dec. 1, 2017, Nov. 21, 2017 (Nov. 21, 2017), XP051379564, pp. 1-24, Retrieved from the Internet: URL:http://www.3gpp.org/tsg_sa/WG2_Arch/TSGS2_124_Reno/Docs/S2-178552_Handover_and_slicing.docx [retrieved on Nov. 21, 2017].
Ericsson: "Slicing for LTE connected to 5G-CN", 3GPP Draft; R2-1704174—Slicing for LTE Connected To 5G-CN, 3rd Generation Partnership Project (3GPP), Mobile Competence Centre; 650, Route Des Lucioles; F-06921 Sophia-Antipolis Cedex; France, vol. RAN WG2, No. Hangzhou, China; May 19, 2017 May 5, 2017, XP051264059, Retrieved from the Internet: URL:http://www.3gpp.org/ftp/tsg_ran/WG2_RL2/TSGR2_98/Docs/ [retrieved on May 5, 2017], 4 pages.
Huawei et al., "TS23.502 NF Services Supported by AMF Discussion," 3GPP Draft, S2-172232, 3rd Generation Partnership Project (3GPP), Mobile Competence Centre, 650, Route Des Lucioles, F-06921 Sophia Antipolis Cedex, France, vol. SA WG2, No. Busan, Korea, Mar. 27, 2017-Mar. 31, 2017, Mar. 26, 2017 (Mar. 26, 2017), XP051247958, pp. 1-7, Retrieved from the Internet: URL:http://www.3gpp.org/ftp/Meetings_3GPP_SYNC/SA2/Docs/[retrieved on Mar. 26, 2017].
Interdigital et al., "Modification of the Set of Selected Slices for a UE," 3GPP Draft, S2-164968, 3rd Generation Partnership Project (3GPP), Mobile Competence Centre, 650, Route Des Lucioles, F-06921 Sophia Antipolis Cedex, France, vol. SA WG2, No. Sanya, China, Aug. 29, 2016-Sep. 2, 2016, Sep. 3, 2016 (Sep. 3, 2016), XP051169023, pp. 1-5, Retrieved from the Internet: URL:http://www.3gpp.org/ftp/tsg_sa/WG2_Arch/TSGS2_116BIS_Sanya/Docs/ [retrieved on Sep. 3, 2016].
International Preliminary Report on Patentability—PCT/US2018/023688, The International Bureau of WIPO—Geneva, Switzerland, dated Nov. 21, 2019.
International Preliminary Reporton Patentability—PCT/US2018/029932 , The International Bureau of WIPO—Geneva, Switzerland, dated Nov. 28, 2019.
International Search Report and Written Opinion—PCT/US2018/023688—ISA/EPO—dated Sep. 3, 2018.
International Search Report and Written Opinion—PCT/US2018/029932—ISA/EPO—dated Jun. 29, 2018.
LG Electronics et al., "TS 23.501: Network Triggered Network Slice Change," 3GPP Draft, S2-173243, 3rd Generation Partnership Project (3GPP), Mobile Competence Centre, 650, Route Des Lucioles,

(56) References Cited

OTHER PUBLICATIONS

F-06921, Sophia Antipolis Cedex, France, vol. SA WG2, No. Hangzhou, May 15, 2017-May 19, 2017, May 9, 2017 (May 9, 2017), XP051268699, pp. 1-4, Retrieved from the Internet: URL:http://www.3gpp.org/ftp/tsg_sa/WG2_Arch/TSGS2_121_Hangzhou/Docs/ [retrieved on May 9, 2017].
LG Electronics., et al., "TS 23.502 P-CR New Procedure on NW Initiated UE Configuration Update", SA WG2 Meeting #120, S2-171854, Mar. 27-31, 2017, Busan, South Korea, pp. 1-4.
Lg Electronics: "TS 23.502: Update of Registration procedure", SA WG2 Meeting #120, S2-171853, Mar. 27-31, 2017, Busan, Republic of Korea, pp. 1-6.
Partial International Search Report—PCT/US2018/023688—ISA/EPO—dated Jun. 7, 2018.
Qualcomm Inc., et al., "TS 23.501: Updates to Network Slicing Description", SA WG2 Meeting #S2-120, S2-172787, Mar. 27-31, 2017, Busan, South Korea, pp. 1-9.
Qualcomm Incorporated: "23.501: PDU Session Release due to slice modification", 3GPP Draft; S2-179348 8697 23.501 PDU Session Release, 3rd Generation Partnership Project (3GPP), Mobile Competence Centre; 650, Route Des Lucioles; F-06921 Sophia-Antipolis Cedex; France vol. SA WG2, No. Reno, Nevada, USA; Nov. 27, 2017-Dec. 1, 2017, Nov. 30, 2017 (Nov. 30, 2017), XP051365875, 2 Pages, Retrieved from the Internet: URL:http://www.3gpp.org/Meetings_3GPP_SYNC/SA2/Docs/S2-179348_8697_23.501 PDU -session release.doc [retrieved on Nov. 30, 2017].
Qualcomm Incorporated: "TS 23.502: Completion of Network Triggered Slice Change text," 3GPP Draft, S2-179430_WAS9350_8696_23 502 NW Triggered Slice Change, 3rd Generation Partnership Project (3GPP), Mobile Competence Centre, 650, Route Des Lucioles, F-06921 Sophia-Antipolis Cedex, F, vol. SA WG2, No. Reno, Nevada, USA, Nov. 27, 2017-Dec. 1, 2017, Dec. 1, 2017 (Dec. 1, 2017), XP051365957, 10 Pages, Retrieved from the Internet: URL:http://www.3gpp.org/Meetings_3GPP_SYNC/SA2/Docs/S2-179430_was9350_8696_23 502 NW Triggered Slice Change. doc [retrieved on Dec. 1, 2017].
Qualcomm Incorporated: "TS 23.502: Handling of PDU Sessions at Slice Unavailability", 3GPP Draft; S2-173106-23.502—Slicing PDU Session Handling, 3rd Generation Partnership Project (3GPP), Mobile Competence Centre; 650, Route Des Lucioles; F-06921 Sophia-Antipolis Cedex; France vol. SA WG2, No. Hangzhou; May 15, 2017-May 19, 2017 May 9, 2017, XP051268576, Retrieved from the Internet: URL:http://www.3gpp.org/ftp/tsg_sa/WG2_Arch/TSGS2_121 Hangzhou/Docs/ [retrieved on May 9, 2017], 31 pages.
Samsung: "Single Value of NSSAI in RRC for CCNF (AMF) Selection," 3GPP Draft; S2-171153 Single Value of NSSAI in RRC for CCNF (AMF) Selection, 3rd Generation Partnership Project (3GPP), Mobile Competence Centre; 650, Route Des Lucioles; F-06921 Sophia-Antipolis Ced, vol. SA WG2, no. Dubrovnik, Feb. 13, 2017-Feb. 17, 2017, Feb. 7, 2017 (Feb. 7, 2017), XP051228409, 3 pages, Retrieved from the Internet: URL: http://www.3gpp.org/ftp/tsg_sa/WG2_Arch/TSGS2_119_Dubrovnik/Docs/ [retrieved on Feb. 7, 2017].

Telecom Italia et al., "Network Slice Repository Function (NSRF)", 3GPP Draft; S2-171744 NSRF Arch & Func Overview Final, 3rd Generation Partnership Project (3GPP), Mobile Competence Centre; 650, Route Des Lucioles; F-06921 Sophia-Antipolis Cedex; France, vol. SA WG2, No. Busan, Korea; Mar. 27, 2017-Mar. 31, 2017, Mar. 26, 2017, XP051247484, Retrieved from the Internet:URL:http://www.3gpp.org/ftp/Meetings_3GPP_SVNC/SA2/Docs/ [retrieved on Mar. 26, 20176], 17 pages.
ZTE (Email Discussion Convener): "Summary of Email Discussion on Slicing WT1 (i.e. NS_WT #1) Assuming One UE—One Slice and Fully Separated Slices (i.e. a basic model)," 3GPP Draft, S2-163508 Network Slice Selection Topic-05, 3rd Generation Partnership Project (3GPP), Mobile Competence Centre, 650, Route Des Lucioles, F-06921 Sophia-Antipolis Cedex, France, vol. SA WG2, No, Vienna, Jul. 11, 2016-Jul. 15, 2016, Jul. 4, 2016 (Jul. 4, 2016), XP051121008, pp. 1-31, Retrieved from the Internet: URL:http://www.3gpp.org/ftp/tsg_sa/WG2_Arch/TSGS2_116_Vienna/Docs/ [retrieved on Nov. 4, 2016].
Ericsson: "23.501: Network Slice Selection Enhancements", SA WG2 Meeting #120, S2-171784, Mar. 27-31, 2017, Busan, Korea, pp. 1-6, Chapter 5. 15. 5.
Huawei, et al., "TS 23.502 SMF Information Context Synchronization between Old AMF and New AMF", SA WG2 Meeting #123, S2-177136, Oct. 23-27, 2017, Ljubljana, Slovenia, pp. 1-17.
Nokia, et al., "On Providing Allowed NSSAI to the RAN in Registration Procedure", 3GPP TSG SA WG2 Meeting #121, S2-173450 (was S2-170778), Hang Zhou, China, May 15, 2017-May 19, 2017, May 9, 2017, Internet URL: http://www.3gpp .org/ftp/tsg_sa/WG2_Arch/TSGS2_121_Hangzhou/Docs/S2-173450.zip.
Nokia: "On Providing Accepted NSSAI to the RAN", S2-170778 (was S2-170347), SA WG2 Meeting #119, Dubrovnik, Croatia, Feb. 13-17, 2017, Feb. 6, 2017 (Feb. 6, 2017), pp. 1-7.
Qualcomm Incorporated: "TS 23.501—PDU Session Mobility Between 3GPP and Non-3GPP," SA WG2 Meeting #S2-120, S2-171706, Mar. 27-31, 2017 (Mar. 31, 2017), 2 pages.
Taiwan Search Report—TW107109818—TIPO—dated Oct. 29, 2021.
Zte, et al., "23.501 P-CR: Network Slicing Update for Supporting Standalone NSSF Plus Miscellaneous Changes to the Existing Text", 3GPP TSG SA WG2#121, S2-173362, May 15, 2017-May 19, 2017, pp. 1-9, May 9, 2017, Internet URL:http://www.3gpp.org/ftp/tsg_sa/WG2_Arch/TSGS2_121_Hangzhou/Docs/S2-173362.zip.
3GPP TS 23.502, 3rd Generation Partnership Project, Technical Specification Group Services and System Aspects, Procedures for the 5G System, Stage 2 (Release 15), V15.0.0, Dec. 2017, pp. 1-258.
3GPP TS 24.501,3rd Generation Partnership Project, Technical Specification Group Core Network and Terminals, Non-Access-Stratum (NAS) protocol for 5G System (5GS), Stage 3 (Release 15), V1.0.0, Mar. 2018, pp. 1-253.
3GPP TSG CT WG1: "Presentation of Specification to TSG: 3GPP TS 24.501 v1.0.0 on Non-Access-Stratum (NAS) protocol for 5G System (5GS); Stage 3", 3GPP Draft, 3GPP TSG CT Meeting #79, CP-180101, Chenai, India; Mar. 19-20, 2018, 2 Pages.
Taiwan Search Report—TW111139021—TIPO—dated Dec. 16, 2022.

MOBILITY BETWEEN AREAS WITH HETEROGENEOUS NETWORK SLICES

This application is a continuation of U.S. patent application Ser. No. 15/927,696, filed on Mar. 21, 2018, which claims priority to Greek Application No. 20170100207, filed May 8, 2017, each of which is assigned to the assignee of the present application and is expressly incorporated by reference herein in its entirety.

FIELD

The present disclosure relates generally to communication systems, and more particularly, to methods and apparatus for handling mobility between areas with heterogeneous network slices in wireless communications systems operating according to new radio (NR) technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In an LTE or LTE-Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio nodeB (NR NB), a network node, a $5^{th}$ generation (5G) NB, an eNB, a next generation nodeB (gNB), etc.). A base station or DU may communicate with a set of user equipments (UEs) on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for handling mobility between areas with heterogeneous network slices in wireless communications systems operating according to new radio (NR) technologies.

Certain aspects provide a method of wireless communications for a user equipment (UE). The method generally includes receiving an indication that a network slice is not available and taking action regarding the PDU session in response to receiving the indication. In some aspects of the present disclosure, the UE may have an active protocol data unit (PDU) session with the network slice. In some aspects of the present disclosure, taking action regarding the PDU session may comprise entering a connection management idle (CM-IDLE) state and, subsequent to entering the CM-IDLE state, initiating a registration procedure with an access and mobility management function (AMF).

Certain aspects provide an apparatus for wireless communications. The apparatus generally includes at least one processor configured to receive an indication that a network slice is not available and take action regarding the PDU session in response to receiving the indication. The apparatus also generally includes a memory coupled with the at least one processor. In some aspects of the present disclosure, the apparatus may have an active protocol data unit (PDU) session with the network slice. In some aspects of the present disclosure, taking action regarding the PDU session may comprise causing the apparatus to enter a connection management idle (CM-IDLE) state and, subsequent to causing the apparatus to enter the CM-IDLE state, causing the apparatus to initiate a registration procedure with an access and mobility management function (AMF).

Certain aspects provide an apparatus for wireless communications. The apparatus generally includes means for receiving an indication that a network slice is not available and means for taking action regarding the PDU session in response to receiving the indication. In some aspects of the present disclosure, the apparatus may have an active protocol data unit (PDU) session with the network slice. In some aspects of the present disclosure, means for taking action regarding the PDU session may comprise means for entering a connection management idle (CM-IDLE) state and means for initiating, subsequent to entering the CM-IDLE state, a registration procedure with an access and mobility management function (AMF).

Certain aspects provide a non-transitory computer-readable medium for wireless communications by a user equipment (UE). The non-transitory computer-readable medium generally includes instructions that, when executed by at least one processor, configure the at least one processor to receive an indication that a network slice is not available, and take action regarding the PDU session in response to receiving the indication. In some aspects of the present disclosure, the UE may have an active protocol data unit (PDU) session with the network slice. In some aspects of the present disclosure, the instructions for taking action regarding the PDU session may comprise instructions for entering a connection management idle (CM-IDLE) state and instructions for initiating, subsequent to entering the CM-IDLE state, a registration procedure with an access and mobility management function (AMF).

Certain aspects provide a method of wireless communications for an access and mobility management function (AMF). The method generally includes detecting that a network slice, with which a user equipment (UE) has at least one active protocol data unit (PDU) session corresponding to that network slice, has or will become unavailable; sending a request to a session management function (SMF) for a modification of the PDU session, in response to the detection; and sending, to the UE, an indication that a re-registration of the UE is required.

Certain aspects provide an apparatus for wireless communications. The apparatus generally includes at least one processor configured to detect that a network slice, with which a user equipment (UE) has at least one active protocol data unit (PDU) session corresponding to that network slice, has or will become unavailable, to cause the apparatus to send a request to a session management function (SMF) for a modification of the PDU session, in response to the detection, and to cause the apparatus to send, to the UE, an indication that a re-registration of the UE is required. The apparatus also generally includes a memory coupled with the at least one processor.

Certain aspects provide an apparatus for wireless communications. The apparatus generally includes means for detecting that a network slice, with which a user equipment (UE) has at least one active protocol data unit (PDU) session corresponding to that network slice, has or will become unavailable, means for sending a request to a session management function (SMF) for a modification of the PDU session, in response to the detection, and means for sending, to the UE, an indication that a re-registration of the UE is required.

Certain aspects provide a non-transitory computer-readable medium for wireless communications for an access and mobility management function (AMF). The non-transitory computer-readable medium generally includes instructions that, when executed by at least one processor, configure the at least one processor to detect that a network slice, with which a user equipment (UE) has at least one active protocol data unit (PDU) session corresponding to that network slice, has or will become unavailable, to cause the AMF to send a request to a session management function (SMF) for a modification of the PDU session, in response to the detection, and to cause the AMF to send, to the UE, an indication that a re-registration of the UE is required.

Certain aspects provide a method of wireless communication for a radio access network (RAN) device. The method generally includes receiving a request for the establishment of access network resources corresponding to a network slice, determining that the network slice is not supported by the RAN device, and sending a notification to an access and mobility management function (AMF) that the network slice is not supported by the RAN device.

Certain aspects provide an apparatus for wireless communications for a radio access network (RAN) device. The apparatus generally includes at least one processor configured to cause the RAN device receive a request for an establishment of access network resources corresponding to a network slice, determine that the network slice is not supported by the RAN device, and cause the RAN device to send a notification to an access and mobility management function (AMF) that the network slice is not supported by the RAN device. The apparatus also generally includes a memory coupled with the at least one processor.

Certain aspects provide an apparatus for wireless communications for a radio access network (RAN) device. The apparatus generally includes means for receiving a request for an establishment of access network resources corresponding to a network slice, means for determining that the network slice is not supported by the RAN device, and means for sending a notification to an access and mobility management function (AMF) that the network slice is not supported by the RAN device.

Certain aspects provide a non-transitory computer-readable medium for wireless communications for a radio access network (RAN) device. The non-transitory computer-readable medium generally includes instructions that, when executed by at least one processor, configure the at least one processor to cause the RAN device to receive a request for an establishment of access network resources corresponding to a network slice, to determine that the network slice is not supported by the RAN device, and to cause the RAN device to send a notification to an access and mobility management function (AMF) that the network slice is not supported by the RAN device.

Certain aspects provide a method of wireless communication for a service management function (SMF). The method generally includes receiving a request from an access and mobility management function (AMF) for a modification of a protocol data unit (PDU) session of a network slice, the request including an indication that a reason for the modification is that the network slice is not supported, and performing the modification of the PDU session.

Certain aspects provide an apparatus for wireless communications for a service management function (SMF). The apparatus generally includes at least one processor configured to cause the SMF to receive a request from an access and mobility management function (AMF) for a modification of a protocol data unit (PDU) session of a network slice, the request including an indication that a reason for the modification is that the network slice is not supported, and to cause the SMF to perform the modification of the PDU session. The apparatus also generally includes a memory coupled with the at least one processor.

Certain aspects provide an apparatus for wireless communications for a service management function (SMF). The apparatus generally includes means for receiving a request from an access and mobility management function (AMF) for a modification of a protocol data unit (PDU) session of a network slice, the request including an indication that a reason for the modification is that the network slice is not supported, and means for performing the modification of the PDU session.

Certain aspects provide a non-transitory computer-readable medium for wireless communications for a service management function (SMF). The non-transitory computer-readable medium generally includes instructions that, when executed by at least one processor, configure the at least one processor to cause the SMF receive a request from an access and mobility management function (AMF) for a modification of a protocol data unit (PDU) session of a network slice, the request including an indication that a reason for the modification is that the network slice is not supported, and to cause the SMF to perform the modification of the PDU session.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
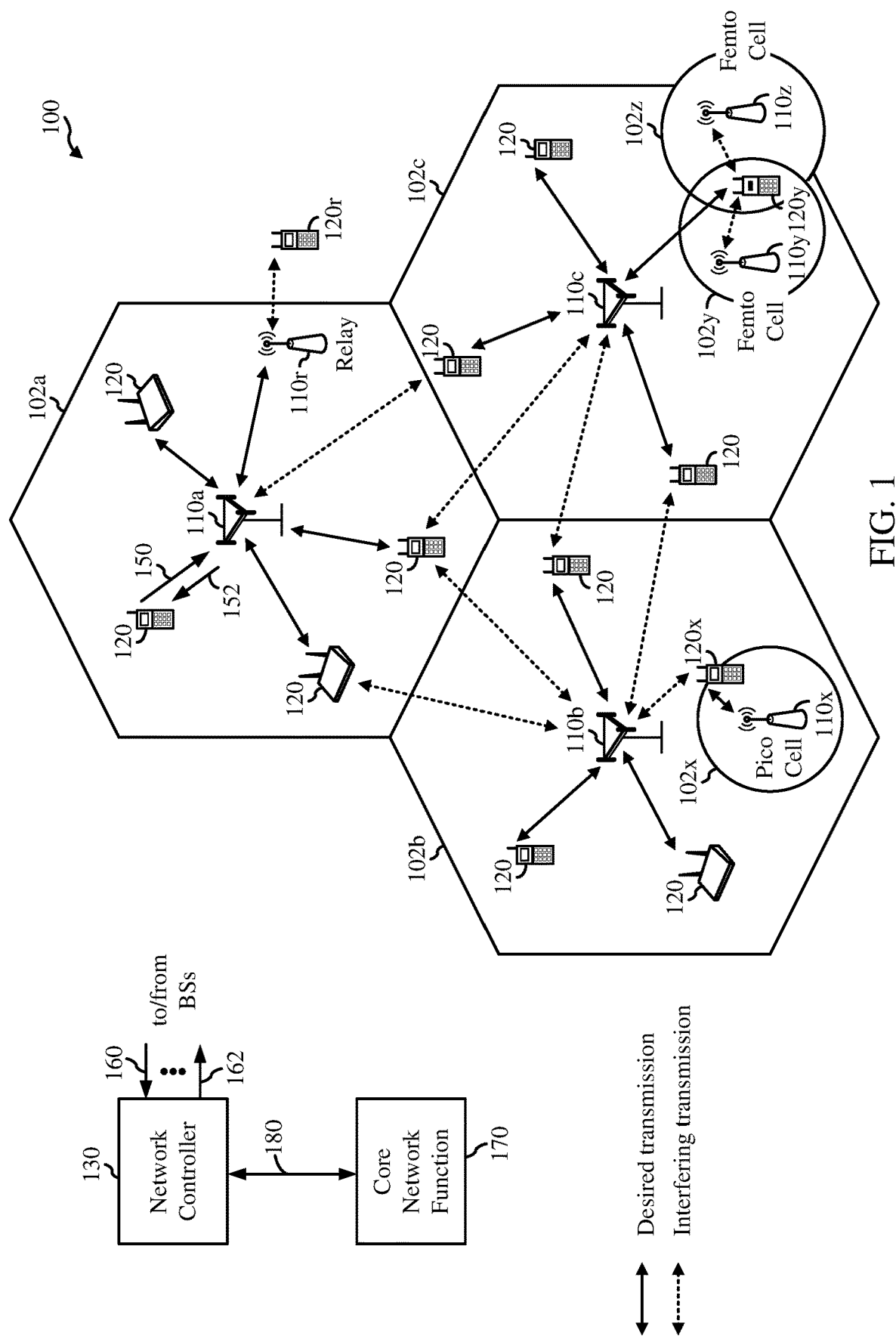
FIG. 1 is a block diagram conceptually illustrating an example telecommunications system, in accordance with certain aspects of the present disclosure.

Aspects of the present disclosure provide apparatus, methods, processing systems, and computer readable mediums for prioritizing incompatible network slices in wireless communications systems operating according to new radio (NR) (new radio access technology or 5G technology) technologies.

NR may support various wireless communication services, such as Enhanced mobile broadband (eMBB) targeting wide bandwidth (e.g. 80 MHz and higher), millimeter wave (mmW) targeting high carrier frequency (e.g. 27 GHz and higher), massive machine type communications (mMTC) targeting non-backward compatible machine type communications (MTC) techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G radio access (RA)), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for prioritizing incompatible network slices, as described in greater detail below with reference to FIGS. 9-12. For example, one or more of the UEs 120 may perform the operations of receiving an indication 152 that a network slice, with which the UE has an active protocol data unit (PDU) session, is not available (e.g., an access and mobility management function (AMF) has triggered disconnection of the active PDU session), and taking action (e.g., entering a connection management idle state and initiating a registration procedure with the AMF or another AMF) regarding the PDU session in response to receiving the indication, as described in more detail with reference to FIG. 9. In another example, the core network function 170 may perform the operations of detecting that a network slice, with which a UE (e.g., UE 120a) has at least one active protocol data unit (PDU) session corresponding to that network slice, has or will become unavailable, and sending a request 180 (which may include an indication to the UE that the AMF has triggered release of the PDU session) to a session management function (SMF) for a modification of the PDU session, in response to the detection, as described in more detail with reference to FIG. 10. In yet another example, the BS 110 may perform the operations of receiving a request 150 for the establishment of access network resources corresponding to a network slice, determining that the network slice is not supported by the BS 110, and sending a notification 160 to an access and mobility management function (AMF) that the network slice is not supported by the BS, as described in more detail with reference to FIG. 11. In still another example, the network controller 130 may perform the operations of receiving (e.g., via one of the BSs 110) a request from an access and mobility management function (AMF) (e.g., possibly implemented in the same network controller 130) for a modification of a protocol data unit (PDU) session of a network slice, the request including an indication that a reason for the modification is that the network slice is not supported, and performing the modification of the PDU session, as described in more detail with reference to FIG. 12.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a NodeB and/or a NodeB subsystem serving this coverage area, depending on the context in which the term is used. In NR systems, the term "cell" and eNB, NodeB, 5G NB, access point (AP), NR BS, NR BS, or transmission reception point (TRP) may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as the Internet or a cellular network) via a wired or wireless communication link. Some UEs may be considered Internet-of-Things (IoT) devices.

In FIG. 1, a solid line with an arrow(s) indicates desired transmissions between a UE and a serving BS, which is a BS designated to serve the UE on the downlink and/or uplink. A dashed line with an arrow(s) indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal fast Fourier transform (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using time division duplex (TDD). A single component carrier bandwidth of 100 MHz may be supported. NR resource blocks may span 12 subcarriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a central unit (CU) and distributed units (DUs). A NR BS (e.g., eNB, 5G NodeB, NodeB, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals (SS)—in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover (HO), and/or measurement based on the indicated cell type.

Figure 2A:
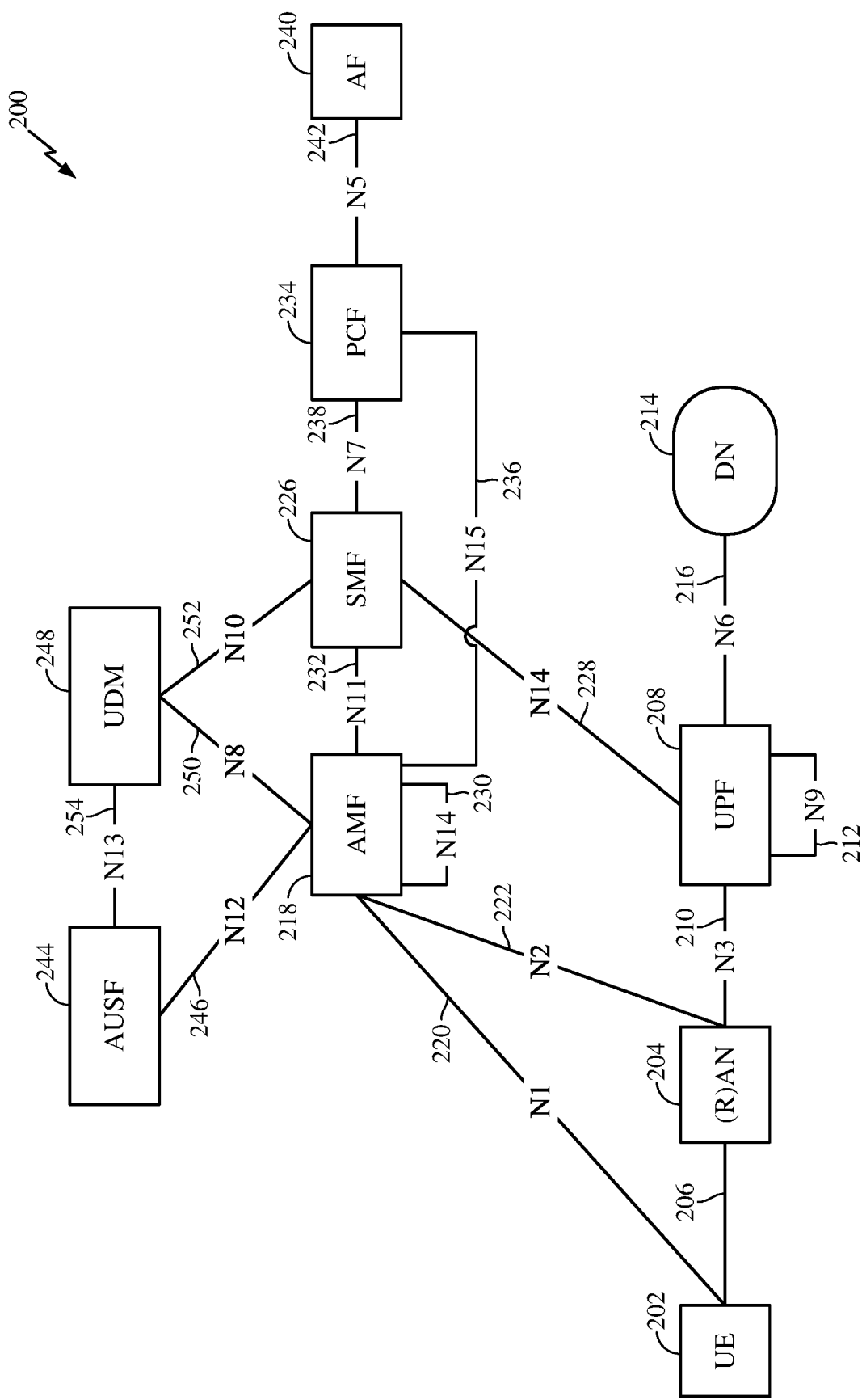
FIGS. 2A-2D are block diagrams illustrating example logical architectures of RANs, in accordance with certain aspects of the present disclosure.

FIG. 2A illustrates an example logical architecture 200 of a New Radio (NR) access network, which may be implemented in the wireless communication system illustrated in FIG. 1. A UE 202 may access a radio access network (RAN) 204 via an NR air interface 206. The RAN may communicate with a user plane function (UPF) 208 via an N3 interface 210. Communications between different UPFs 208 may be conveyed via an N9 interface 212. The UPFs may communicate with a data network (DN) (e.g., the Internet, network-operator-provided services) 214 via one or more N6 interfaces 216. The UE may communicate with one or more core access and mobility management functions (AMFs) 218 via an N1 interface 220. The RAN may communicate with the one or more AMFs via an N2 interface 222. The UPFs may communicate with a session management function (SMF) 226 via an N4 interface 228.

Communications between different AMFs 218 may be conveyed via an N14 interface 230. The AMFs may communicate with the SMF 226 via an N11 interface 232. The AMFs may communicate with a policy control function (PCF) 234 via an N15 interface 236. The SMF may communicate with the PCF via an N7 interface 238. The PCF may communicate with an application function (AF) 240 via an N5 interface 242. The AMFs may communicate with an authentication server function (AUSF) 244 via an N12 interface 246. The AMFs may communicate with a unified data management (UDM) 248 via an N8 interface 250. The SMF may communicate with the UDM via an N10 interface 252. The AUSF may communicate with the UDM via an N13 interface 254.

While the example architecture 200 illustrates a single UE, the present disclosure is not so limited, and the architecture may accommodate any number of UEs. Similarly, the architecture shows the UE accessing a single DN, but the present disclosure is not so limited, and the architecture accommodates a UE communicating with a plurality of DNs, as described below with reference to FIG. 2B.

Figure 2B:
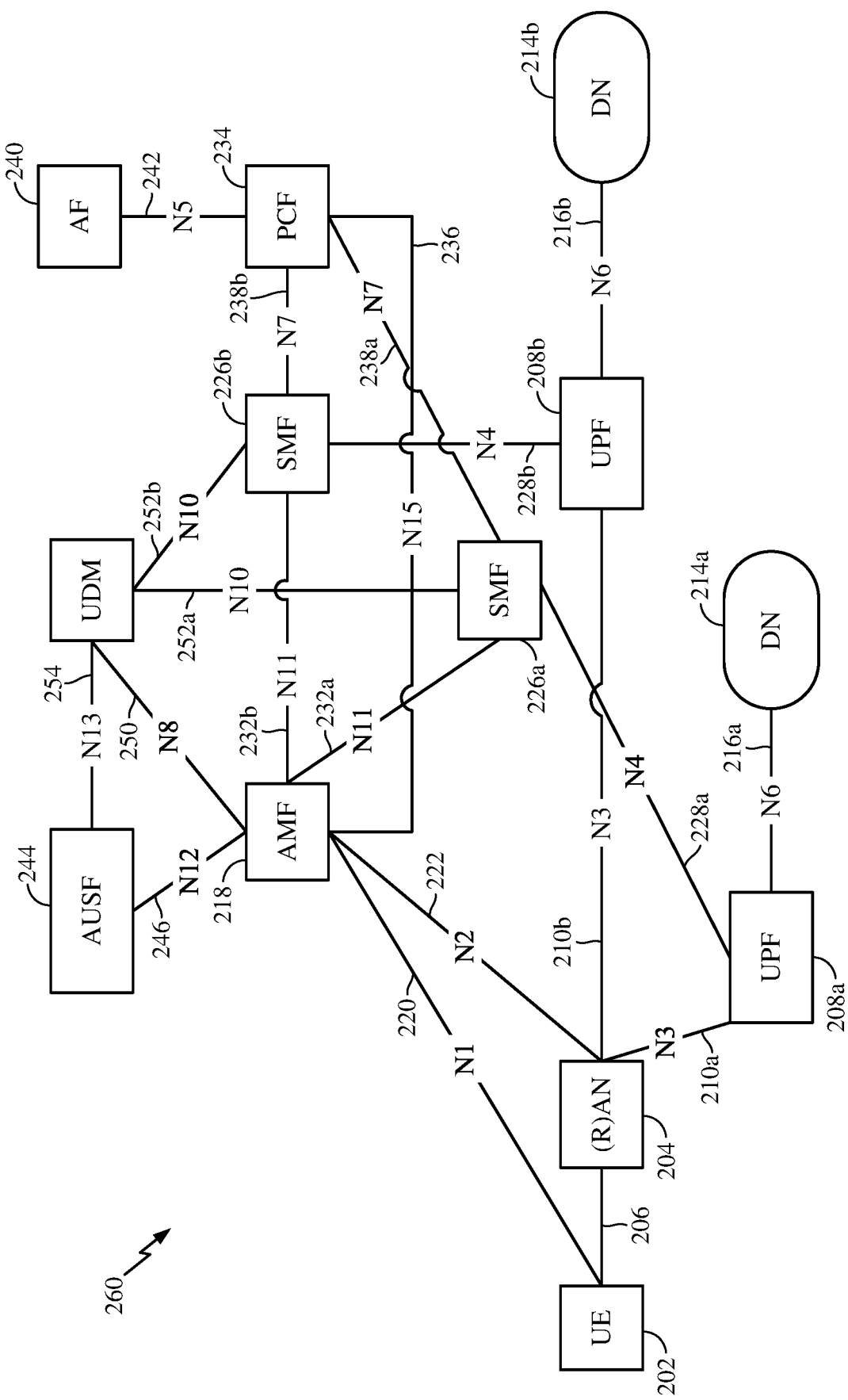

FIG. 2B illustrates an example logical architecture 260 of a New Radio (NR) access network (RAN), which may be implemented in the wireless communication system illustrated in FIG. 1. The logical architecture 250 is similar to the logical architecture 200 shown in FIG. 2A, with many of the same entities shown and labeled with the same labels. Thus, only differences from FIG. 2A will be described. The UE 202 in FIG. 2B is accessing two DNs, 214a and 214b, via the RAN 204. The RAN communicates with a first UPF 208a via a first N3 interface 210a. The RAN also communicates with a second UPF 208b via a second N3 interface 210b. Each UPF communicates with a corresponding DN 214a or 214b via a corresponding N6 interface 216a or 216b. Similarly, each UPF communicates with a corresponding SMF 226a or 226b via a corresponding N4 interface 228a or 228b. Each SMF communicates with the AMF 218 via a corresponding N11 interface 232a or 232b. Similarly, each SMF communicates with the PCF via a corresponding N7 interface 238a or 238b.

Figure 2C:
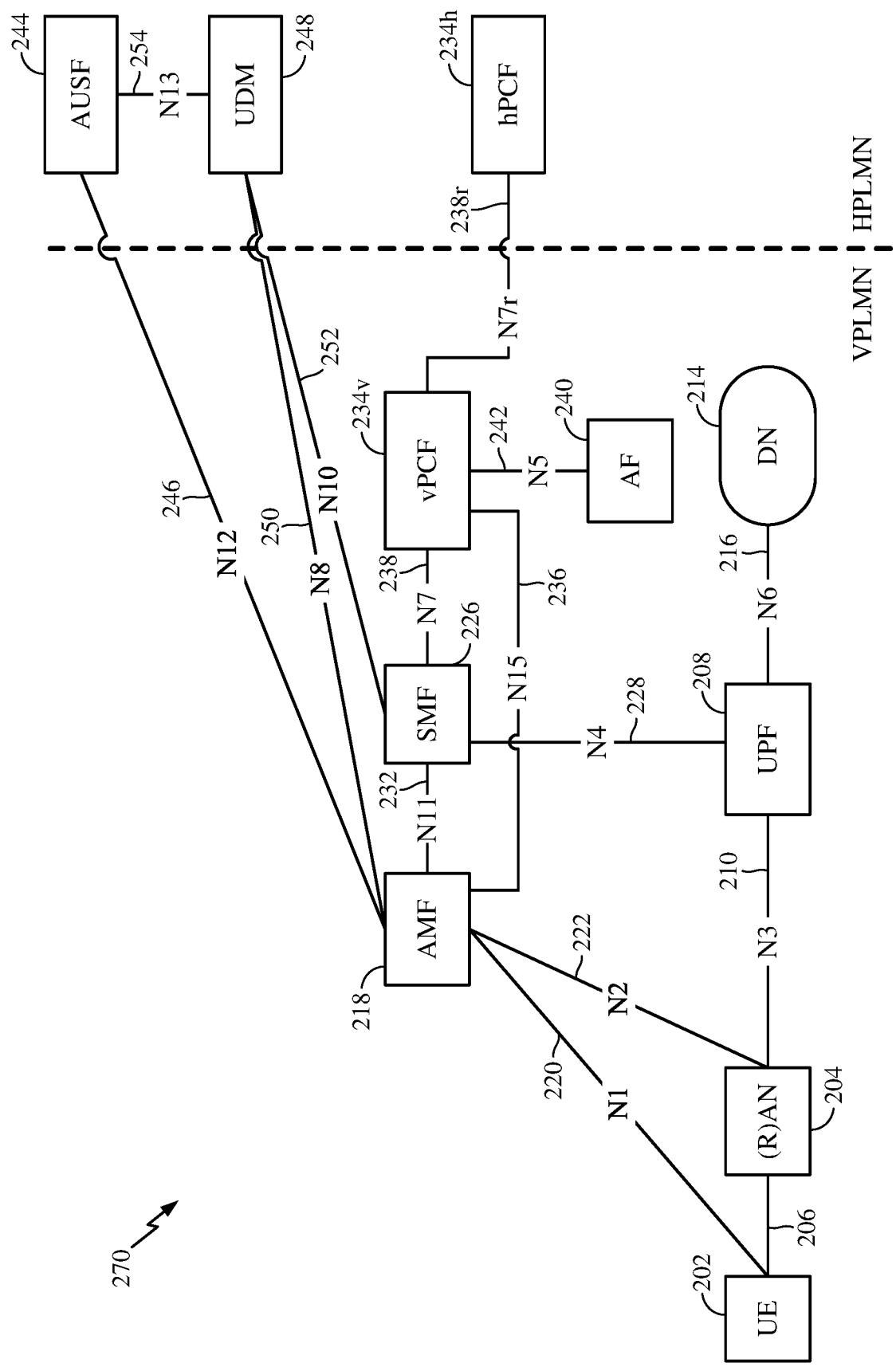

FIG. 2C illustrates an example logical architecture 270 of a New Radio (NR) access network (RAN), which may be implemented in the wireless communication system illustrated in FIG. 1. The logical architecture 270 is similar to the logical architecture 200 shown in FIG. 2A, with many of the same entities shown and labeled with the same labels. Thus, only differences from FIG. 2A will be described. In the logical architecture 270, the UE is roaming, and is therefore connected with the home physical land mobile network (HPLMN) of the UE via certain entities in the visited physical land mobile network (VPLMN). In particular, the SMF communicates with the VPLMN PCF (vPCF) 234v, but some policy information regarding the UE's access to the DN may be retrieved from the HPLMN PCF (hPCF) 234h via a roaming N7r interface 238r. In FIG. 2C, the UE is able to access the DN via the VPLMN.

Figure 2D:
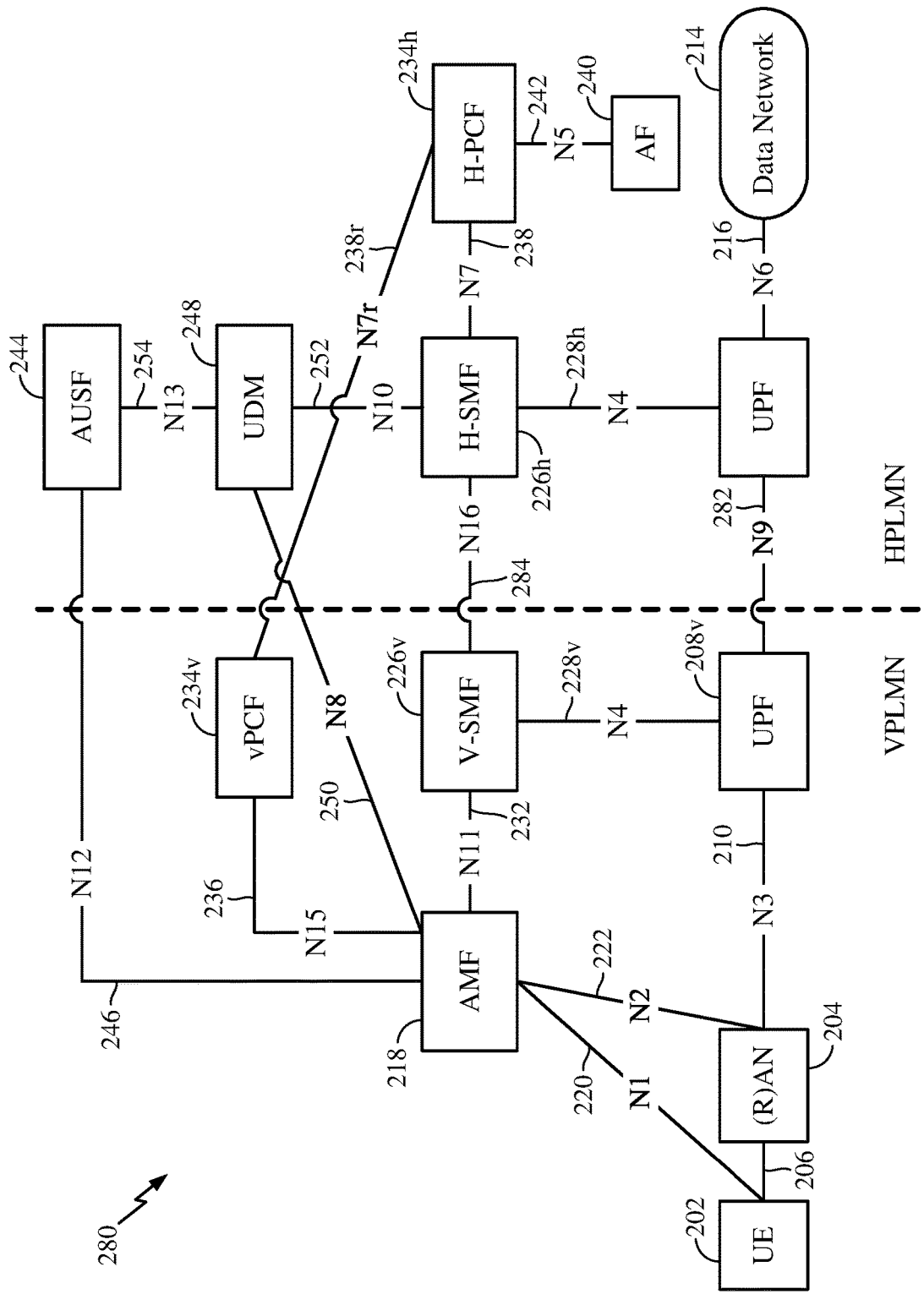

FIG. 2D illustrates an example logical architecture 280 of a New Radio (NR) access network (RAN), which may be implemented in the wireless communication system illustrated in FIG. 1. The logical architecture 280 is similar to the logical architecture 270 shown in FIG. 2C, with many of the same entities shown and labeled with the same labels. Thus, only differences from FIG. 2C will be described. In the logical architecture 280, the UE is roaming, and is therefore connected with the home physical land mobile network (HPLMN) of the UE via certain entities in the visited physical land mobile network (VPLMN). Unlike FIG. 2C, the UE in FIG. 2D is accessing a DN that the UE is not able to access via the VPLMN. Differences from FIG. 2C include that the UPF in the VPLMN communicates with the VPLMN SMF (V-SMF) 226v via an N4 interface 228v, while the UPF in the HPLMN communicates with the HPLMN SMF (H-SMF) 226h via an N4 interface 228h. The UPF of the VPLMN communicates with the UPF of the HPLMN via an N9 interface 282. Similarly, the V-SMF communicates with the H-SMF via an N16 interface 284.

Operations performed and protocols used by the various entities shown in the exemplary logical architectures 200, 250, 270, and 280 in FIGS. 2A-2D are described in more detail in documents "TS 23.501; System Architecture for the 5G System; Stage 2 (Release 15)" and "TS 23.502; Procedures for the 5G System; Stage 2 (Release 15)," both which are publicly available.

Figure 3:
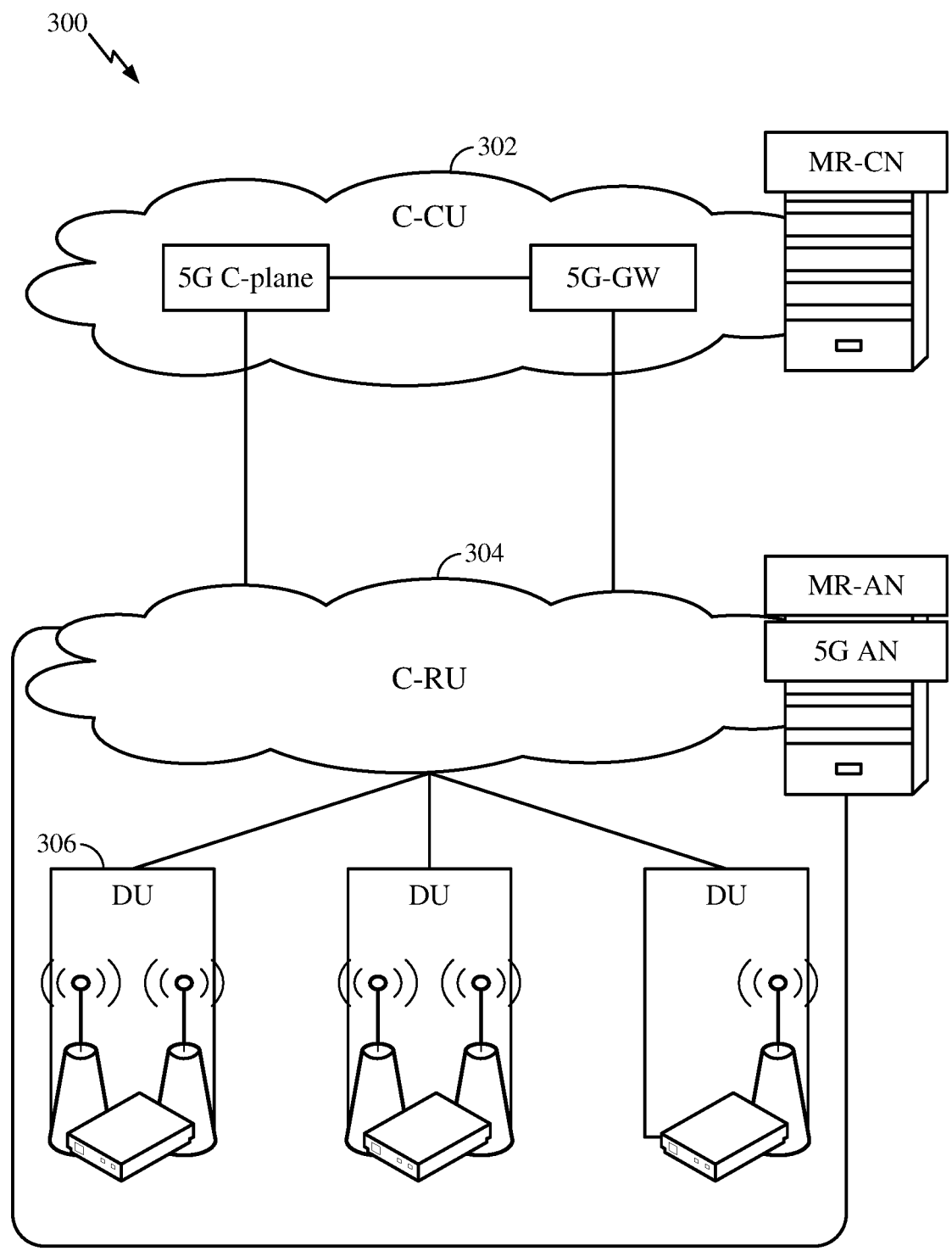
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more access network controller (ANC) functions. Optionally, the C-RU may host core network functions locally. The C-RU may have distributed deployment. The C-RU may be closer to the network edge than a C-CU.

A distributed unit (DU) 306 may host one or more TRPs (e.g., an edge node (EN), an edge unit (EU), a radio head (RH), a smart radio head (SRH), or the like). The DU may be located at edges of the network with radio frequency (RF) functionality.

As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., C-CU 302) and/or one or more distributed units (e.g., one or more transmission and reception points (TRPs)).

Figure 4:
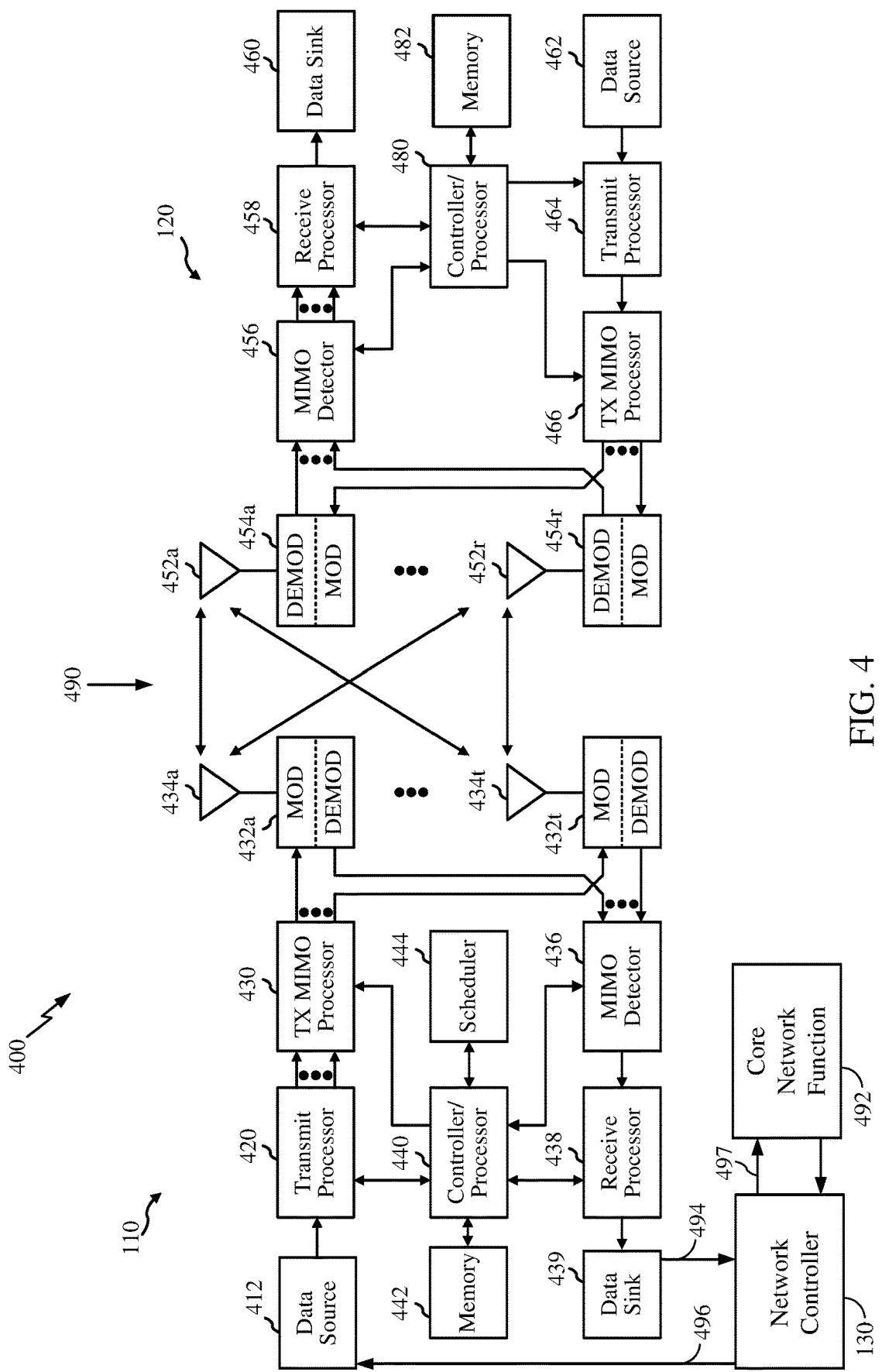
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9-12. For example, the UE 120 may perform the operations of receiving an indication, at 490, that a network slice, with which the UE has an active protocol data unit (PDU) session, is not available, and taking action regarding the PDU session in response to receiving the indication, as described in more detail with reference to FIG. 9. In the example, the controller/processor 480 of the UE may, by executing instructions obtained from the memory 482, receive the indication. Still in the example, the controller/processor takes action and/or causes other components to take action regarding the PDU session (e.g., entering a connection management idle state or initiating a registration procedure with an AMF) in response to receiving the indication. In the example, the UE may receive signaling 490 comprising the indication. Controller/processor 480 and/or receive processor 458 may execute instructions obtained from memory 482 in receiving the signaling.

Figure 10:
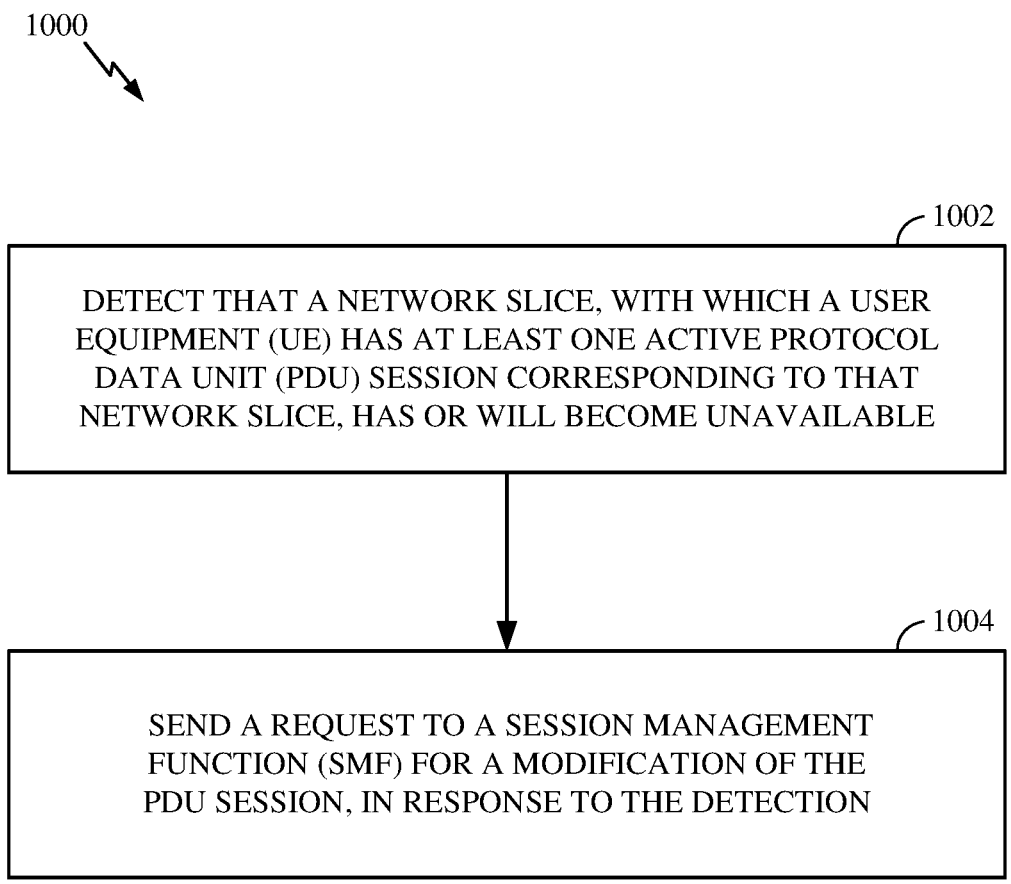
FIG. 10 illustrates example operations for wireless communications, in accordance with certain aspects of the present disclosure.

In another example, the network controller 130 may perform the operations of detecting that a network slice, with which a user equipment (UE) has at least one active protocol data unit (PDU) session corresponding to that network slice, has or will become unavailable, and sending a request 497 (which may include an indication to the UE that the network controller has triggered release of the PDU session) to a session management function (SMF) for a modification of the PDU session, in response to the detection, as described below with reference to FIG. 10.

In yet another example, the BS 110 may perform the operations of receiving a request 490 for the establishment of access network resources corresponding to a slice, determining that the network slice is not supported by the RAN device, and sending a notification 497 to an access and mobility management function (AMF) that the network slice is not supported by the RAN device, as described in more detail with reference to FIG. 11.

In yet another example, the network controller 130 may perform the operations of receiving a request 494 from an access and mobility management function (AMF) for a modification of a protocol data unit (PDU) session of a network slice, the request including an indication that a reason for the modification is that the network slice is not supported, and performing the modification of the PDU session, as described in more detail with reference to FIG. 12.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via antennas 434a through 434t, respectively.

At the UE 120, antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 9-10, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
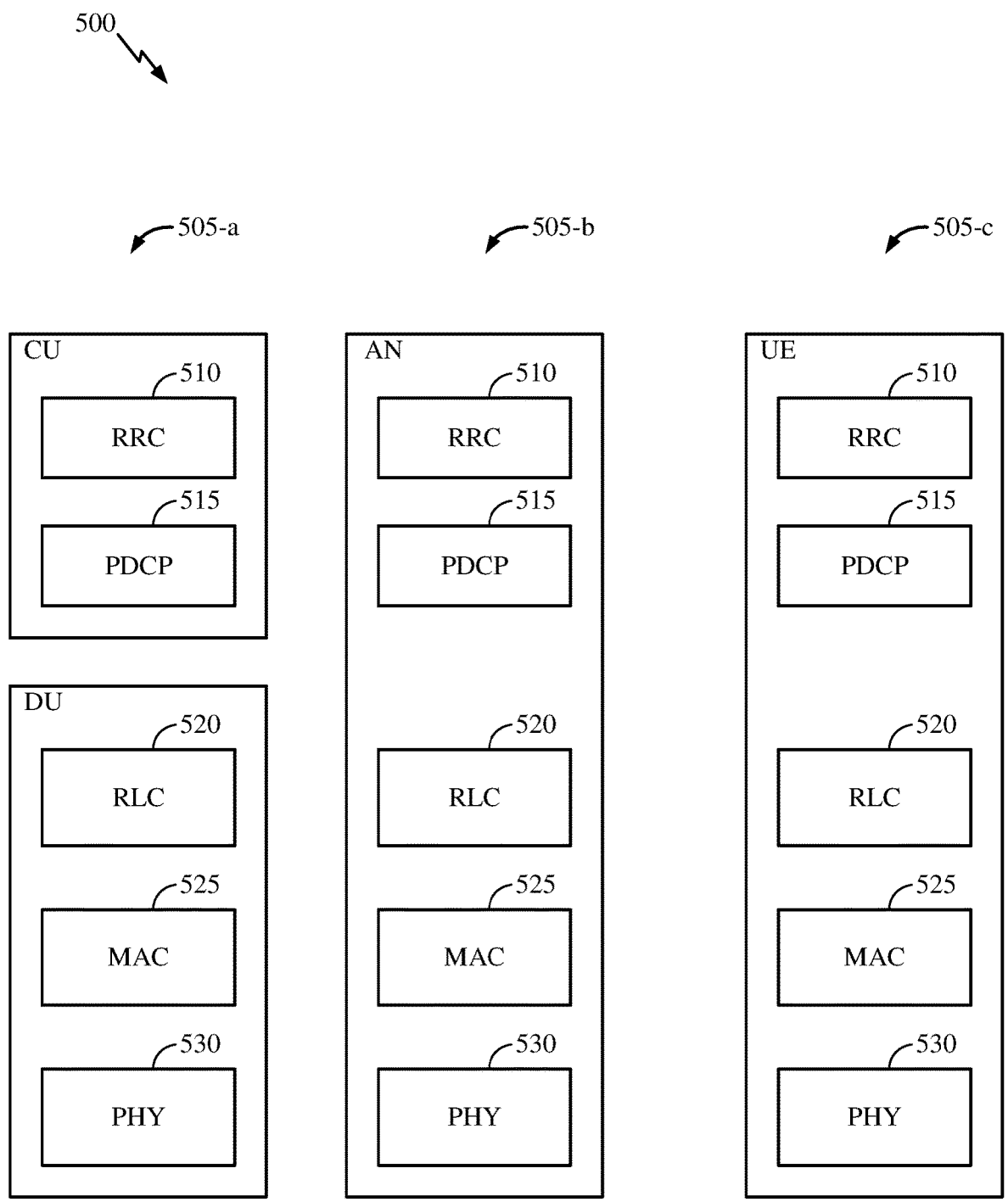
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or application specific integrated circuit (ASIC), portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack 505-c (e.g., the RRC layer 510, the PDCP layer 515, the RLC layer 520, the MAC layer 525, and the PHY layer 530).

Connection management (CM) comprises the functions of establishing and releasing a signaling connection between a UE (e.g., UE 202 in FIGS. 2A-2D) and the Access and Mobility Management Function (e.g., AMF 218 in FIGS. 2A-2D) over N1 (e.g., N1 interface 220 in FIGS. 2A-2D). This signaling connection is used to enable non-access stratum (NAS) signaling exchange between the UE and the core network. Connection management comprises both the access network (AN) signaling connection between the UE and the AN (e.g. radio resource control (RRC) connection over 3GPP access) and the N2 connection (e.g., N2 interface 222 in FIGS. 2A-2D) for this UE between the AN and the AMF.

In some embodiments, the UE may be in one of two CM states that reflect the NAS signaling connectivity of the UE with the AMF. The two CM states are CM-IDLE and CM-CONNECTED. In a CM-IDLE case, in some embodiments, the UE may have no NAS signaling connection established with the AMF over an N1 interface. In such embodiments, the UE may perform cell selection, cell reselection and public land mobile network (PLMN) selection. In addition, in such embodiments, there may be no N2 and N3 connections for the UE in the CM-IDLE state.

In the CM-IDLE state, the UE may perform one or more of the following actions. In some embodiments, the UE may respond to paging, if received, by performing a service request procedure. In some embodiments, the UE may perform a service request procedure when the UE has uplink signaling or user data to be sent. In some embodiments, the UE may enter the CM-CONNECTED state whenever an AN signaling connection is established between the UE and the AN (e.g. entering RRC Connected state over 3GPP access). The transmission of an Initial NAS message (Registration Request, Service Request or Deregistration Request) may initiate the transition from CM-IDLE to CM-CONNECTED state. In the CM-IDLE state, the AMF may also perform one or more of the following actions. In some embodiments, the AMF may perform a network triggered service request procedure when it has signaling or mobile-terminated data to be sent to this UE, by sending a Paging Request to this UE. In some embodiments, the AMF may enter CM-CONNECTED whenever an N2 connection is established for this UE between the AN and the AMF.

In the CM-CONNECTED state, the UE may have a NAS signaling connection with the AMF over N1. In the CM-CONNECTED state, in some embodiments, the UE may enter CM-IDLE state whenever the AN signaling connection is released (e.g., entering RRC Idle state over 3GPP access). In the CM-CONNECTED state, in some embodiments, the AMF may enter CM-IDLE state whenever the N2 signaling connection for this UE is released. In some embodiments, upon the completion of a NAS signaling procedure, the AMF may decide to release the NAS signaling connection with the UE, after which the state at both the UE and the AMF may be changed to CM-IDLE. In some embodiments, the AMF may keep a UE in CM-CONNECTED state until the UE de-registers from the core network.

Figure 6A:
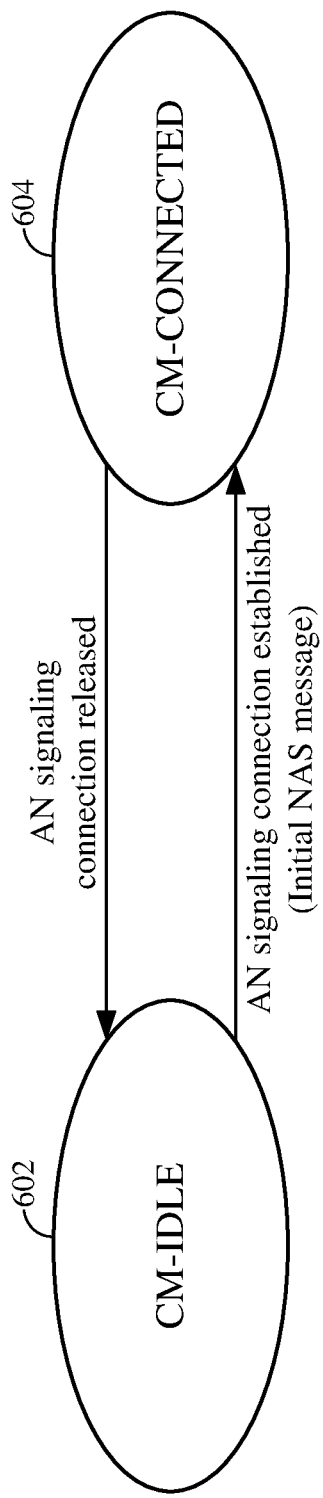
FIGS. 6A and 6B illustrate example connection management state models.
Figure 6B:
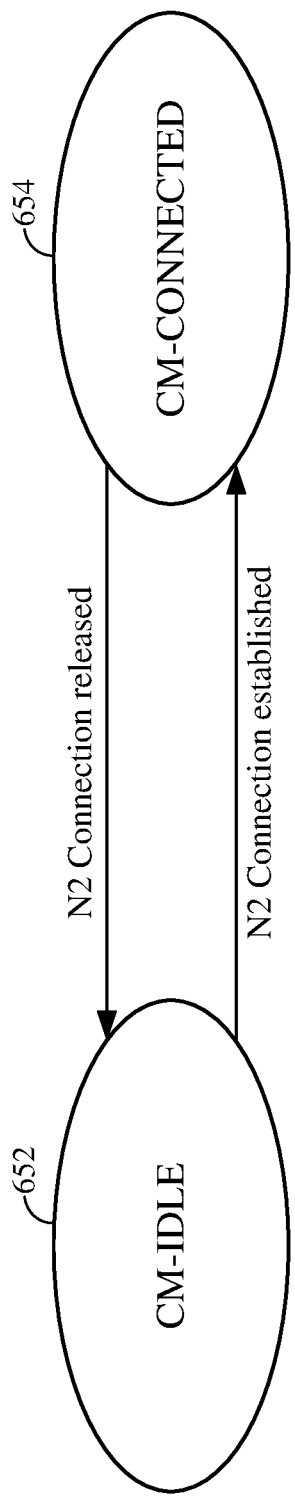

FIGS. 6A and 6B further illustrate example connection management state models. In FIG. 6A, transitions of a UE (e.g., UE 202 in FIGS. 2A-2D) between a CM-IDLE state 602 and a CM-CONNECTED state 604 are illustrated. In FIG. 6B, transitions of an AMF (e.g., AMF 218 in FIGS. 2A-2D) state with regard to a UE that transitions between a CM-IDLE state 652 and a CM-CONNECTED state 654 are illustrated. In some embodiments, when a UE becomes CM-IDLE over an access, the user plane (UP) connection of the PDU sessions that were active on the access may go inactive. In addition to the connection management states, certain embodiments described herein relate to NAS signaling connection management. In some embodiments, NAS signaling connection management may include the functions of establishing and releasing a NAS signaling connection. In regards to NAS signaling connection establishment, in some embodiments, an NAS signaling connection establishment function may be provided by the UE and the AMF to establish an NAS signaling connection for a UE in CM-IDLE state. In some embodiments, when the UE in the CM-IDLE state needs to transmit an NAS message, the UE may initiate a Service Request or a registration procedure to establish a signaling connection to the AMF.

Also, in some embodiments, based on UE preferences, UE subscription, UE mobility pattern and network configuration, the AMF may keep the NAS signaling connection until the UE de-registers from the network. In regards to NAS signaling connection release, in some embodiments, the procedure of releasing an NAS signaling connection is initiated by the 5G (R)AN node or the AMF. In some embodiments, the UE may assume the NAS signaling connection is released if it detects the RRC connection is released. After the NAS signaling connection is released, in some embodiments, the UE and the AMF may enter the CM-IDLE state.

System functionality may include registration and connection management. Registration management may be used to setup and release a signaling relation between the UE and the network and establish the user context in the network. More specifically, in some embodiments, a UE/user may need to register with the network to receive services that require registration. In some embodiments, to register to the selected PLMN, the UE may initiate an initial registration procedure. Also, in some embodiments, the UE may initiate a periodic registration procedure upon the expiry of the periodic registration timer in order to maintain reachability. In addition, in some embodiments, the UE may initiate a registration procedure upon mobility (e.g. enters new tracking area (TA)) with the network to track the UE location and for reachability.

In addition to registration management, system functionality may include connection management, which as described above, may be used to establish and release the signaling connection between the UE and the AMF to provide signaling connectivity. The 5G system (5GS) Connection Management (CM) states, CM-IDLE and CM-CONNECTED, describe the signaling connectivity between the UE and the AMF.

A UE may be in a 5G CM-IDLE state when no NAS signaling connection between UE and AMF exists. In CM-IDLE state, in some embodiments, the UE may perform cell selection/reselection and PLMN selection. In addition, in some embodiments, the UE in the CM-IDLE state may respond to paging by performing a service request procedure and perform a service request procedure when the UE has uplink signaling or user data to be sent.

Unlike the CM-IDLE state, the UE and the AMF may enter the CM-CONNECTED state when the NAS signaling connection is established between the UE and the AMF. Initial NAS messages that initiate a transition from CM-IDLE to CM-CONNECTED state may, in some embodiments, include a Registration Request, Service Request or De-Registration Request. In some embodiments, the UE may be in the CM-CONNECTED state when a signaling connection between the UE and the AMF exists. In some embodiments, the UE in the CM-CONNECTED state may perform a registration procedure when the TA in the received system information is not in the list of TAs that the UE registered with the network.

In some embodiments, the UE may need to register with the network to be authorized to receive services, to enable mobility tracking, and to enable reachability. In some embodiments, the registration procedure may be used, for example, when the UE needs to initially register to the 5G system (in the mobility procedure when the UE changes to a new TA in idle mode) and when the UE performs a periodic update (due to a predefined time period of inactivity), etc.

As described above, 5G Systems may provide support for a UE to connect to a local area data network (LADN) reachable within a certain area. In order to enable a UE to connect to the LADN, the 5G system may send a notification to the UE including information about the LADN and its availability, etc. In some embodiments, based on the LADN information received in the notification, the UE may then request a PDU session establishment for the local area data network while the UE is located in the area.

Figure 7:
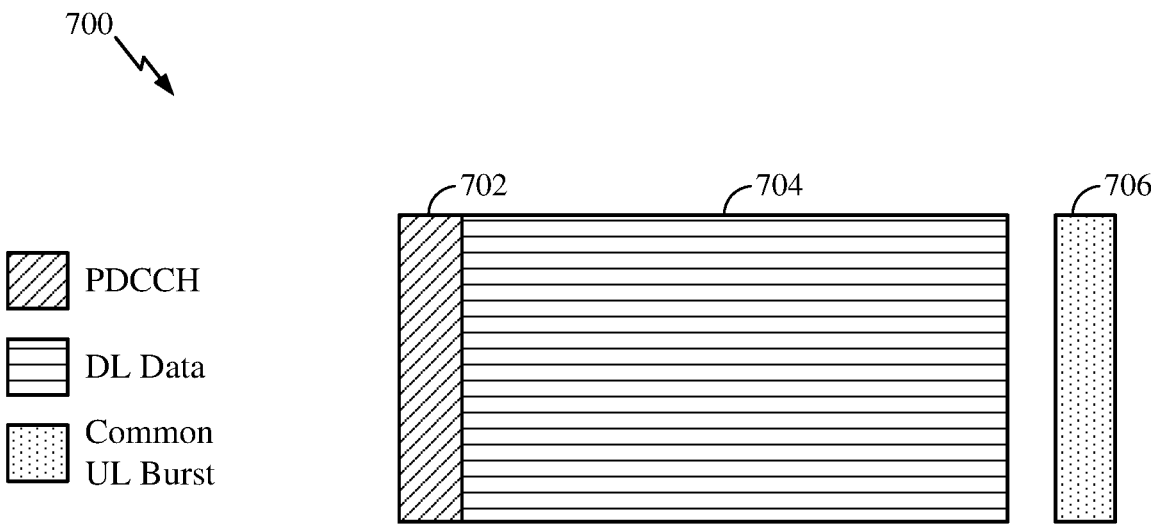
FIG. 7 illustrates an example of a DL-centric subframe, in accordance with certain aspects of the present disclosure.

FIG. 7 is a diagram 700 showing an example of a DL-centric subframe. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include a common UL portion 706. The common UL portion 706 may sometimes be referred to as an UL burst, a common UL burst, and/or various other suitable terms. The common UL portion 706 may include feedback information corresponding to various other portions of the DL-centric subframe. For example, the common UL portion 706 may include feedback information corresponding to the control portion 702. Non-limiting examples of feedback information may include an acknowledgment (ACK) signal, a negative acknowledgment (NACK) signal, a hybrid automatic retransmission request (HARD) indicator, and/or various other suitable types of information. The common UL portion 706 may include additional or alternative information, such as information pertaining to random access channel (RACH) procedures, scheduling requests (SRs), and various other suitable types of information. As illustrated in FIG. 7, the end of the DL data portion 704 may be separated in time from the beginning of the common UL portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 8:
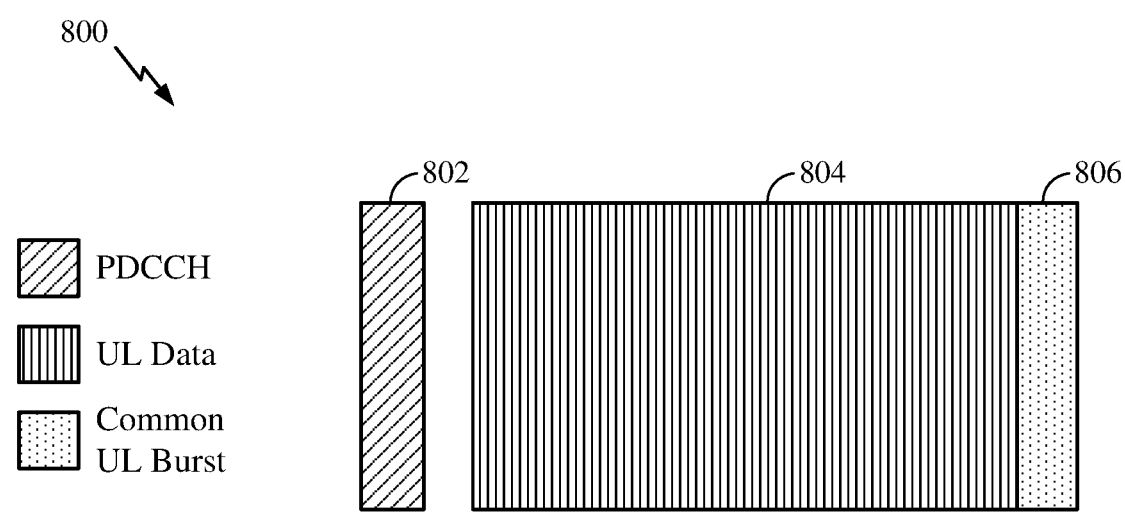
FIG. 8 illustrates an example of an UL-centric subframe, in accordance with certain aspects of the present disclosure.

FIG. 8 is a diagram 800 showing an example of an UL-centric subframe. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL data portion 804. The UL data portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL data portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 806. The common UL portion 806 in FIG. 8 may be similar to the common UL portion 706 described above with reference to FIG. 7. The common UL portion 806 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In aspects of the present disclosure, a network slice is a complete logical network that comprises a set of network functions and corresponding resources necessary to provide certain network capabilities and network characteristics. A network slice includes functions of both an access network (AN) and a core network (CN). A network slice instance (NSI) is the instantiation of a network slice, i.e. a deployed set of network functions delivering the intended network slice services according to a network slice template.

According to aspects of the present disclosure, a network slice comprises all of the control plane and user plane functionality and resources required to fulfill a particular service or set of services and may include: 1) core network control plane and user plane network functions, as well as their resources (in terms of compute, storage and network resources, including transport resources between the network functions); 2) a radio access network; and 3) in the case of a network slice supporting a roaming service, a VPLMN part and a HPLMN part.

In aspects of the present disclosure, network slices may differ for supported features and network functions. The operator may deploy multiple network slice instances delivering the same features to different groups of UEs, e.g. as the NSIs deliver different committed services and/or because one or more NSIs may be dedicated to one or more customers.

According to aspects of the present disclosure, a UE can simultaneously be served by one or more network slice instances via an AN. The AMF instance serving the UE logically belongs to each of the network slice instances serving the UE, i.e., the AMF instance is common to the network slice instances serving a UE.

In aspects of the present disclosure, AMF discovery and selection for a set of slices for a UE may be triggered by a first contacted AMF in a registration procedure, and AMF discovery and selection may lead to a change of AMF for a UE. SMF discovery and selection is initiated by the AMF when an SM message to establish a PDU session is received from the UE. The network repository function (NRF) may be used to assist the discovery and selection tasks.

According to aspects of the present disclosure, a PDU session belongs to one and only one specific network slice instance. Different network slice instances do not share a PDU session, though different slices may have slice-specific PDU sessions using the same DN.

According to aspects of the present disclosure, UE-related NG2 and NG1 signaling are handled by a set of common control network functions (CCNFs) that in a 5G system may be implemented in the AMF. A core network part of a network slice may share some network functions with other core network parts of network slices which serve the same UE, including the NG1 and NG2 terminations, in the CCNF. As used herein, a core network part of a network slice may be referred to as a core network (or CN) slice, and a radio network part of a network slice may be referred to as a RAN slice.

In aspects of the present disclosure, once a UE is assigned to a CCNF during the attach procedure, a signaling connection between the UE and the CCNF is based on the UE temporary ID, i.e. the RAN part of the network slice routes UE signaling to the CCNF based on a temporary ID the UE provides in RRC signaling. The CCNF is logically part of all network slice instances (NSIs) that are being used for the UE. So when a new NSI is added to or an existing NSI is removed from a set of slices used by a UE, a more optimal CCNF may have to be selected to serve the new set of NSIs used for the UE, thus triggering a CCNF redirection procedure. Prior to the UE being assigned to a serving CCNF during the attach procedure (e.g., due to the processing of the network policy or subscription policy), signaling from the UE may be first routed by the RAN to a default CCNF based on a RAN routing policy, if the UE does not have a temporary identifier (ID), yet.

According to aspects of the present disclosure, a network slice: 1) offers a UE particular system behaviors tailored to specific application needs, from the standpoint of specific control plane (e.g., a UE may not need machine type (MT) procedures, or require optimal behavior for massive MTC, or critical communications, etc.) or user plane behaviors (e.g. the UE may need a slice supporting header compression); and 2) offers a UE access to resources allocated for a specific service, application domain, or tenant (e.g. a minimum level of guaranteed resources or aggregate number of subscribers allowed to access the service at any point in time). In aspects of the present disclosure, a tenant represents an organization, agency, application (or application class), or business entity which is entitled to access the service for the use of guaranteed network resources through a predefined service level agreements and/or policy with the network operator.

For example, a tenant of a PLMN resource may be a wholesale customer of the PLMN (e.g. a big company, or an agency which requires the PLMN to provide at least access to a predefined set of resources, or some specific policies in handling slice subscribers of the agency at times of congestion). A PLMN may apply tenant-specific policies at times of overload. An example of a tenant may be some public safety agency. The tenancy concept may also be used to meet application specific requirements. For example, an enterprise may deploy a factory-floor set of devices and a set of devices that are associated to non-factory-floor operations. The enterprise may have a policy to allocate at least 60% of network resources (whether in the RAN or in the core network) to factory floor operation at times of congestion but not to segregate resources at all times. In the example, the enterprise may set up a tenanted slice such that factory floor devices get at least 60% of resources at times of congestion.

In aspects of the present disclosure, at least two dimensions of a network slice can identify a slice via a single network slice selection assistance information (S-NSSAI) that identifies the network slice.

According to aspects of the present disclosure, an S-NSSAI may comprise: 1) a slice/service type (SST), which refers to the expected network slice behavior in terms of features and services (e.g., eMBB service, CriC, mMTC or other behaviors which may also be operator specific); and 2) a slice differentiator (SD), which is optional information that complements the Slice/Service type(s) to allow further differentiation for selecting a network slice instance from the one or more network slice instances that all comply with the indicated Slice/Service type.

In aspects of the present disclosure, an S-NSSAI can have standard values or PLMN-specific values. S-NSSAIs with PLMN-specific values are associated to the PLMN ID of PLMN that assigns it. An S-NSSAI may not be used by a UE in access stratum procedures in any PLMN other than the PLMN to which the S-NSSAI is associated.

According to aspects of the present disclosure, a NSSAI is a collection of Single Network Slice Selection Assistance Informations (S-NSSAIs). Each S-NSSAI may be used by the network to assist in selecting a particular network slice instance (NSI). The CN part of a network slice instance(s) serving a UE is selected by CN.

In aspects of the present disclosure, an NSSAI can be PLMN-specific or standardized. When an NSSAI is PLMN-specific, a UE may store the PLMN ID of the PLMN that assigns the NSSAI. The UE may not use this NSSAI outside the PLMN that assigns the NSSAI as the NSSAI identifies a PLMN-specific slice that may not be available elsewhere.

According to aspects of the present disclosure, a standardized NSSAI may be used in all PLMNs. Federations of PLMNs may agree on common values of S-NSSAIs and support the same slice types.

In aspects of the present disclosure, a core network receiving an NSSAI in NAS signaling or in RAN-CN signaling may handle incoming NAS signaling in accordance with policies specific to each S-NSSAI. The NSSAI may also allow the core network to understand which NSI or set of NSIs that a UE may request to be selected at attach time, out of a subscribed set of S-NSSAIs (if available) applicable to the PLMN.

According to aspects of the present disclosure, a 5G core network (5GC) may be able to provide policy information from the PCF to a UE. Such policy information may include:

1) An access network discovery & selection policy that may be used by the UE for selecting non-3GPP accesses and for deciding how to route traffic between the selected 3GPP and non-3GPP accesses;

2) a UE Route Selection Policy (URSP) that may be used by the UE to determine how to route outgoing traffic (e.g., via an established PDU session, via offloading to a non-3GPP access outside a PDU session, or via a new PDU session that the traffic causes to be established). The URSP policy may include one or more of the following policies:

2a) a Session and Service Continuity (SSC) Mode Selection Policy (SSCMSP) that may be used by the UE to associate UE applications with SSC modes and to determine the PDU session which this traffic should be routed to. SSCMSP may also be used by the UE to determine when a new PDU session should be requested with a new SSC mode.

2b) a Network Slice Selection Policy (NSSP) that may be used by the UE to associate UE applications with SM-NSSAIs and to determine the PDU session which this traffic should be routed to. NSSP may also be used to determine when a new PDU session should be requested with a new SM-NSSAI.

2c) a data network name (DNN) Selection Policy that may be used by the UE to associate UE traffic with one or more DNNs and to determine the PDU session which this traffic should be routed to. DNN Selection Policy may also be used by the UE to determine when a PDU session should be requested to a new DNN and may also indicate the access type (3GPP or non-3GPP) on which a PDU session to a certain DNN should be requested.

2d) a Non-seamless Offload Policy that may be used by the UE to determine which traffic should be non-seamlessly offloaded to non-3GPP access (i.e. outside of a PDU session).

The URSP may be provided from the PCF to an AMF via an N15 interface and then from the AMF to the UE via an N1 interface. The AMF typically does not change the URSP provided by PCF.

The UE Route Selection Policy (URSP) may include a prioritized list of URSP rules, and each USRP rule may be composed of one or more of the following components:

Traffic filter: Information that can be compared against data traffic and determine if the rule is applicable to this data traffic or not. A traffic filter may include application identifiers and other information, if needed. The traffic that matches the traffic filter of a URSP rule is referred to as the "matching traffic" for this URSP rule.

Non-seamless offload: This indicates if the matching traffic is Prohibited, Preferred or Permitted (i.e. allowed but not preferred) to be offloaded to non-3GPP access outside of a PDU session. Non-seamless offload may also indicate a specific non-3GPP access type (e.g. wireless local area network (WLAN), a service set identifier (SSID) of a network) on which the matching traffic is Prohibited, Preferred or Permitted.

Slice Info: This includes the S-NSSAI required for the matching traffic. Slice info may also include multiple S-NSSAIs in priority order if the matching traffic may be transferred over a PDU session supporting any of these S-NSSAIs. Slice info is used to associate the matching traffic with one or more S-NSSAIs.

Continuity Types: This includes the SSC Mode required for the matching traffic. Continuity Types may also include multiple SSC Modes in priority order if the matching traffic may be transferred over a PDU session supporting any of these SSC Modes. Continuity Types are used to associate the matching traffic with one or more SSC modes.

DNNs: This includes the DNN required for the matching traffic. DNNs may also include multiple DNNs in priority order if the matching traffic may be transferred over a PDU session to any of these DNNs. It is used to associate the matching traffic with one or more DNNs.

Access Type: If the UE needs to establish a PDU session for the matching traffic, this indicates the type of access (3GPP or non-3GPP) on which the PDU session should be established. Access type may also indicate a prioritized list of accesses on which the PDU session establishment should be attempted.

Each URSP rule may include a traffic filter and one or more of the other components, which specify how the matching traffic should be routed.

Some wireless systems (e.g., 5G systems, eMBB systems) support network slicing. In a system supporting network slicing, a UE may be configured with a list, which may be referred to as a Network Slice Selection Assistance Information (NSSAI), of slices supported. Each slice may be identified by a Single NSSAI (S-NSSAI), containing a Slice Type and a Service Descriptor. When the UE provides an NSSAI to the network to indicate to which slices the UE wishes to connect, the network sometimes may not be able to select an AMF that supports all of the S-NSSAIs in the NSSAI provided by the UE (e.g., the network may have one or more AMFs, dedicated to a specific S-NSSAI, which do not support other S-NSSAIs).

Depending on the types of services to which the UE requires access, the network may select S-NSSAIs, from S-NSSAIs supported by the network, based on a subscription of the UE and network policies that the network will support for the UE. The network may then select an AMF with which to support the UE, based on the selected S-NSSAIs. Some S-NSSAIs configured in the UE may be required by the UE, depending on the type of connectivity required by the UE, i.e., based on the UE subscription. Some S-NSSAIs may not be required but may have a higher priority than other S-NSSAIs.

As used herein, an "allowed NSSAI" is an NSSAI provided (to a UE) by a serving PLMN during a registration procedure, indicating the NSSAI allowed by the network in the serving PLMN for the current registration area.

As used herein, a "configured NSSAI" is an NSSAI that has been provisioned in a UE. The NSSAI may be said to be configured in the UE.

As used herein, a "requested NSSAI" is an NSSAI that a UE provides to the network when performing a regret matching (RM) procedure.

According to aspects of the present disclosure, an S-NSSAI may comprise: 1) a slice/service type (SST), as mentioned above, which refers to the expected Network Slice behavior in terms of features and services; 2) a slice differentiator (SD), as mentioned above, which is optional information that complements the SST(s) to allow further differentiation for selecting a network slice instance from the one or more network slice instances that comply with the indicated SST; and 3) an optional S-NSSAI Priority, which identifies the priority of a specific S-NSSAI with respect to other S-NSSAI.

Example Mobility Between Areas with Heterogeneous Network Slices

Network operators may deploy network slicing in a non-homogeneous (i.e., heterogeneous) manner in a network. Examples of heterogeneity in network slicing deployment may include 1) CN nodes, of a network supporting a specific slice, may not support the slice in all possible locations; 2) the RAN may not be able to support the slice in all RAN nodes (e.g. for slices requiring specific RAN features or resources, or requiring connectivity via specific UPFs); and 3) The slice may not be available over a non-3GPP access.

In order to support UE mobility in a network with non-homogeneous support of certain slicing, it is desirable for the network to have procedures for handling the PDU sessions active for a specific slice when the UE moves to an area where the slice is not available.

Development of 5th generation systems (5GS) has introduced the concept of selective user plane establishment, i.e., a CM-IDLE UE can trigger a service request (SR) to request user plane establishment for a subset of existing PDU sessions for the UE. Thus, an SM context of a CM-CONNECTED UE and the network may have some PDU sessions with user plane established and some PDU sessions that are "suspended", i.e. with no user plane established and/or allocated.

When a UE with PDU sessions active for a slice moves to an area where the slice is not available, the network side may implement one or more behaviors. The behaviors of the network side may include:

1) the PDU sessions are released, thus leading to the NSI to be "disconnected" for the UE. This may be achieved via a network-triggered PDU session release procedure as defined in TS 23.502 section 4.3.4 when the network detects the UE has moved outside the area of availability of the NSI. A new triggering mechanism from the AMF is defined based on the AMF detecting slice unavailability in both idle mode and active mode mobility.

2) the user plane of the PDU sessions is released (i.e. the PDU sessions are "suspended") while the PDU sessions' control plane contexts are maintained. This may be achieved via a network-triggered PDU session suspension procedure (i.e. a PDU session modification that leads to no user plane for the PDU session) that releases the user plane resources when the network detects the UE has moved outside the area of availability of the NSI.

According to aspects of the present disclosure, to enable release of the PDU sessions or of the user plane of the PDU sessions as mentioned above, both the network and the UE may perform certain operations.

In aspects of the present disclosure, operations by a UE are provided to enable the UE to accommodate release or suspension of PDU sessions for an NSI. Whether the PDU sessions are released or suspended, it is desirable for the UE to be aware that the slice is not available anymore.

According to aspects of the present disclosure, when a PDU session for a slice (i.e. for an S-NSSAI) is released or suspended, the UE may consider the slice unavailable until the slice becomes available again, and the UE is informed by the network that the slice is available. The UE considering the slice unavailable may cause the UE, if the PDU sessions were released, to not attempt to establish a PDU session for the slice. The UE considering the slice unavailable may cause the UE, if the PDU sessions were suspended, to not attempt to re-establish the user plane for the PDU session.

In aspects of the present disclosure, a UE may attempt to access the DNN corresponding to an unavailable slice over other slices (i.e. other S-NSSAIs). The UE may be provided with slice-related policies (e.g. in URSP policies) that indicate, for a given DNN and for a given slice, whether the same DNN can be accessed via a different slice (e.g., in order of priority with respect to which slices should be used for the DNN).

According to aspects of the present disclosure, in order to make a UE aware that a slice is not available anymore as result of a mobility event or other network event, the network may indicate to the UE that the slice is not available anymore:

In aspects of the present disclosure, if a slice is not available in the whole new registration area (e.g., that the UE moved into), then the network may provide to the UE a new Allowed NSSAI (e.g., not including the slice that is not available), in order to indicate that the slice is not available anymore. Upon receiving the new Allowed NSSAI and the Allowed NSSAI not containing an S-NSSAI for which the UE has established connectivity (i.e. one or more PDU sessions) to the NSI, then the UE considers the slice as not being available.

According to aspects of the present disclosure, if the slice is not available only in certain RAN locations in a registration area, then the network still provides the corresponding S-NSSAI in the Allowed NSSAI at registration. However, during UE mobility, in idle mode (e.g., CM-IDLE state) or in connected mode (e.g., CM-CONNECTED state), within the registration area, the slice may become unavailable.

In aspects of the present disclosure, if a slice is not available in a registration area, and the UE is connected to the slice in a previous registration area, then the network may release the PDU sessions to the NSI when the network detects that the UE has entered the new registration area.

According to aspects of the present disclosure, upon detecting that a UE has a slice active for an S-NSSAI that is not part of a new Allowed NSSAI that an AMF provides to the UE, the AMF may trigger disconnection of the PDU session(s) or user plane resource release for the PDU session(s) corresponding to the slice identified by the S-NSSAI.

According to aspects of the present disclosure, a UE may receive a new Allowed NSSAI for a new registration area that does not include a slice with which the UE has at least one active PDU session corresponding to that slice. Upon receiving the new Allowed NSSAI, the UE may not attempt to establish connectivity with the slice while in the new registration area.

According to aspects of the present disclosure, if a slice is available in a registration area with the exception of some RAN locations or, e.g., of availability over the non-3GPP access, the network may suspend the user plane of the PDU sessions corresponding to the slice, when the UE enters a location where the slice is not available.

In aspects of the present disclosure, the UE shall not attempt to establish user plane resources for the suspended PDU sessions for the slice after receiving an indication that the slice is not available.

According to aspects of the present disclosure, upon idle mode mobility (e.g. registration procedure or SR) of a UE, if the network detects that a slice for which an existing PDU session of the UE is not available, the network may reject the resource establishment for the PDU session. The AMF may store the S-NSSAI corresponding to each active PDU session for the UE to be able to detect the unavailable slices with respect to the active PDU sessions.

According to aspects of the present disclosure, upon connected mode (e.g., CM-CONNECTED state) mobility of a UE, the target RAN may notify the AMF of the supported S-NSSAIs of the target RAN, or the AMF may be configured with such information. The AMF releases and/or does not establish user plane resources corresponding to a slice that the target RAN does not support. The AMF may also trigger the SMF(s) to release the user plane for the PDU session(s) corresponding to the S-NSSAI when the slice corresponding to the PDU session(s) is not available in the target cell. The network may provide an indication in the RRC reconfiguration of the UE to indicate to the UE the reason for the user plane resource release, i.e. the PDU session suspension, and/or provides an indication that the slice is not available (e.g., a list of S-NSSAIs). The indication may be generated by the AMF and provided to the target RAN in order to be delivered to the UE by the target RAN. Additionally or alternatively, the AMF may provide the indication to the UE with a NAS message sent to the UE during the connected mode mobility procedure.

According to aspects of the present disclosure, upon the UE re-entering the area of availability of a slice, the AMF may trigger the SMF(s) to re-establish the user plane resources for the PDU sessions corresponding to the S-NSSAI(s) of the PDU sessions that were suspended.

In aspects of the present disclosure, upon the UE re-entering the area of availability of a slice, the network may inform the UE, and the UE may re-establish the user plane for the PDU sessions when the UE requires transport resources for the PDU sessions.

According to aspects of the present disclosure, in idle mode mobility, the network may return a new Allowed NSSAI containing the allowed S-NSSAI. In connected mode (e.g., CM-CONNECTED state) mobility, the AMF receives, from the RAN, a list of supported slices (S-NSSAIs), and compares the list with the S-NSSAIs in the UE contexts for the active PDU sessions (containing at least for each PDU session the PDU Session ID, the serving SMF, and the related S-NSSAI—if any). If any of the PDU sessions are suspended and the S-NSSAI is now available, the network notifies the UE in the same way the network notified the UE on unavailability of a slice.

According to aspects of the present disclosure, when a slice is unavailable (either disconnected by the network or the related PDU sessions are suspended), a UE may use a PDU session to the same DNN in another available slice.

In aspects of the present disclosure, due to slice separation, a PDU session of slice 1 cannot be managed by the control plane of slice 2 (e.g., completely different policy and charging control (PCC) policies and PCF, different authorization/authentication, etc.) so remapping the PDU session from slice 1 to slice 2 cannot be done. However, in some cases remapping might be possible for some PDU sessions. If the network remaps a PDU session, it is desirable for the network to tell the UE of the remapping (i.e. by providing the new mapping of PDU session IDs to S-NSSAIs).

According to aspects of the present disclosure, in addition to the current slice-related policies that associate an application and/or services to (DNN, S-NSSAI) combinations, for each DNN the UE may also be provided with a policy indicating which other S-NSSAI can be used for the DNN. The policies may indicate a primary S-NSSAI for the application and/or services and the DNN and include other S-NSSAIs that can be used in case the primary S-NSSAI is not available.

According to aspects of the present disclosure, upon the primary S-NSSAI not being allowed by the Allowed NSSAI or upon the primary S-NSSAI becoming unavailable after PDU sessions to the DNN have been established for the primary S-NSSAI, the UE may attempt to establish a PDU session for the DNN to one of the other S-NSSAIs for the DNN and use the PDU session for the application and/or service transport. This may cause a change of internet protocol (IP) address and/or a change of UPF anchor, since the UE would be using a different PDU session, and therefore may not be applicable to all applications and/or services and to all DNNs. For example, a UE is notified that S-NSSAI1 is not available after a mobility event; and the UE has a need for that PDU session. In the example, the UE has a policy that says that PDU session can be used in S-NSSAI2. Still in the example, if the PDU session is active already, then the UE uses the PDU session, otherwise the UE activates the PDU session on S-NSSAI2.

Figure 9:
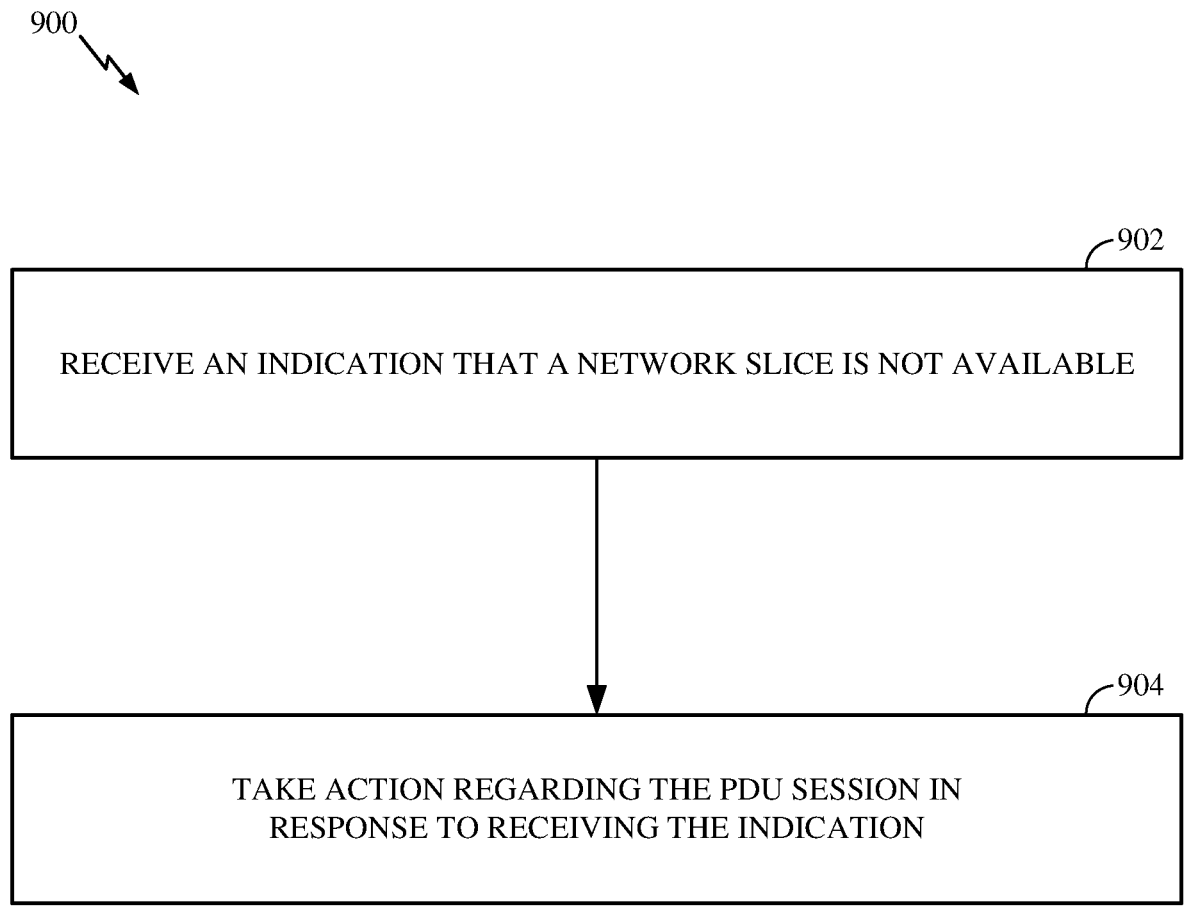
FIG. 9 illustrates example operations for wireless communications, in accordance with aspects of the present disclosure.

FIG. 9 illustrates example operations 900 for wireless communications, in accordance with aspects of the present disclosure. Operations 900 may be performed by a UE, for example, UE 202, shown in FIGS. 2A-2D.

Operations 900 begin, at block 902, with the UE receiving an indication that a network slice is not available. In some aspects of the present disclosure, the UE may have an active protocol data unit (PDU) session with the network slice.

At block 904, operations 900 continue with the UE taking action regarding the PDU session in response to receiving the indication.

According to aspects of the present disclosure, taking action by the UE may comprise refraining from requesting transmission resources for the active PDU session corresponding to the network slice.

In aspects of the present disclosure, taking action by the UE may comprise refraining from requesting transmission resources for a new PDU session corresponding to the network slice.

According to aspects of the present disclosure, taking action by the UE may comprise searching for an alternative transport for information of the PDU session in another PDU session corresponding to another network slice.

In aspects of the present disclosure, receiving the indication by the UE (e.g., in block 902 of FIG. 9) may comprise receiving the indication in a non-access stratum (NAS) message.

According to aspects of the present disclosure, receiving the indication by the UE (e.g., in block 902 of FIG. 9) may comprise receiving the indication in an access stratum message.

In aspects of the present disclosure, receiving the indication by the UE (e.g., in block 902 of FIG. 9) may comprise receiving the indication in an access resource reconfiguration message.

According to aspects of the present disclosure, receiving the indication as described above in block 902 may comprise receiving an indication that an access and mobility management function (AMF) has triggered disconnection of the active PDU session.

In aspects of the present disclosure, taking action regarding the PDU session as described above in block 904 may comprise entering a connection management idle (CM-IDLE) state. Subsequent to entering the CM-IDLE state, the UE may initiate a registration procedure with an AMF.

According to aspects of the present disclosure, the UE may obtain an indication from the AMF that a current temporary identifier (e.g., a 5th generation globally unique temporary identifier (5G-GUTI)) of the UE is invalid or that the UE needs to use the permanent identity (e.g., subscription permanent identifier (SUPI)) of the UE when registering (e.g., as part of a mobility management procedure). The AMF may also indicate to the UE that the UE should perform the registration procedure after the UE enters the CM-IDLE state.

In aspects of the present disclosure, the UE may remove the current temporary identifier (e.g., a 5G-GUTI) of the UE from a configuration of the UE in response to receiving the indication that the current temporary identifier is invalid.

According to aspects of the present disclosure, in response to receiving the indication that the network slice is not available, an upper layer (e.g., a NAS layer) of a protocol stack of the UE may transmit to a lower layer (e.g., an access stratum (AS) layer) of the protocol stack an indication to release a connection with a radio access network (RAN) and to re-establish the connection, a network slice selection assistance information (NSSAI) request, an indication to refrain from providing a current temporary identifier (e.g., a 5th generation globally unique temporary identifier (5G-GUTI)) for mobility management procedures (e.g., registration procedures), or a combination thereof.

In aspects of the present disclosure, initiating the registration procedure by the UE may include transmitting a registration request. The registration request message may include a subscription permanent identifier (SUPI) of the UE.

According to aspects of the present disclosure, the UE may receive a new allowed NSSAI (e.g., newer than an NSSAI the UE received prior to receiving the indication that the AMF triggered disconnection of an active PDU session, as in block 902) comprising a network slice instance (NSI) identifier (NSI ID) identifying the network slice with which the UE had the active PDU session, from the AMF prior to entering the CM-IDLE state. The UE may include the new allowed NSSAI in a registration request message transmitted by the UE as part of the registration procedure of block 904.

In aspects of the present disclosure, the UE may connect another PDU session to a network slice associated with the other AMF to convey data of the active PDU session, if the UE initiates the registration procedure of block 904 with the other AMF. That is, if the UE registers with a new AMF, the UE may connect another PDU session to a network slice associated with the other AMF and convey data of the disconnected PDU session via the other PDU session and network slice associated with the other AMF.

According to aspects of the present disclosure, the UE may receive the indication that the AMF has triggered disconnection of the active PDU session via a non-access stratum (NAS) message.

In aspects of the present disclosure, the UE may initiate the registration procedure of block 904 with the AMF and connect another PDU session to a network slice associated with the AMF to convey data of the disconnected active PDU session.

According to aspects of the present disclosure, receiving the indication that the network slice is not available may comprise receiving a request from an AMF to re-register with the network.

FIG. 10 illustrates example operations 1000 for wireless communications, in accordance with aspects of the present disclosure. Operations 1000 may be performed by an access and mobility management function (AMF), such as AMF 218 shown in FIGS. 2A-2D.

Operations 1000 begin, at block 1002, with the AMF detecting that a network slice, with which a user equipment (UE) has at least one active protocol data unit (PDU) session corresponding to that network slice, has or will become unavailable.

At block 1004, operations 1000 continue with the AMF sending a request to a session management function (SMF) for a modification of the PDU session, in response to the detection.

In aspects of the present disclosure, sending the request to the SMF in block 1004 may include an indication to the UE that the AMF has triggered release of the PDU session.

According to aspects of the present disclosure, the AMF may send, to the UE, an indication of a reason for the modification of the PDU session.

In aspects of the present disclosure, the AMF may send the indication to the UE via a non-access stratum message.

According to aspects of the present disclosure, the AMF may send the indication to the UE via an access stratum message.

In aspects of the present disclosure, the AMF may send the indication to the UE via a radio access network (RAN).

According to aspects of the present disclosure, the AMF may detect that the network slice has or will become unavailable based on an indication, received by the AMF, from a radio access network (RAN) communicating with the UE.

In aspects of the present disclosure, the AMF may detect that the network slice has or will become unavailable based on a message received by the AMF from the UE.

According to aspects of the present disclosure, the request for the modification of the PDU session sent by the AMF may comprise a request to disconnect the PDU session, which may be sent to the UE in addition to the SMF.

In aspects of the present disclosure, the request for the modification of the PDU session sent by the AMF may comprise a request to release the user plane resources of the PDU session.

According to aspects of the present disclosure, the AMF may also send an indication to the UE that the UE is required to re-register (i.e., perform a re-registration procedure) with the network. The indication that the UE is required to re-register may comprise an indication that a 5th generation globally unique temporary identifier (5G-GUTI) of the UE is invalid. The indication that the 5G-GUTI is invalid may be sent via a non-access stratum (NAS) message.

In aspects of the present disclosure, the AMF may also send a new allowed network slice selection assistance information (NSSAI) (e.g., different from a previous NSSAI sent to the UE) that includes a network slice instance (NSI) identifier (NSI ID) identifying the network slice with which the UE had the active PDU session.

According to aspects of the present disclosure, the AMF may receive a registration request message from the UE after sending the request to modify the PDU session to the SMF at block 1004. The AMF may register the UE and support one or more network slices for the UE.

In aspects of the present disclosure, the request from the AMF to the SMF may include a request to release the PDU session.

According to aspects of the present disclosure, the AMF may detect that the network slice has or will become unavailable based on a message received by the AMF from the UE.

Figure 11:
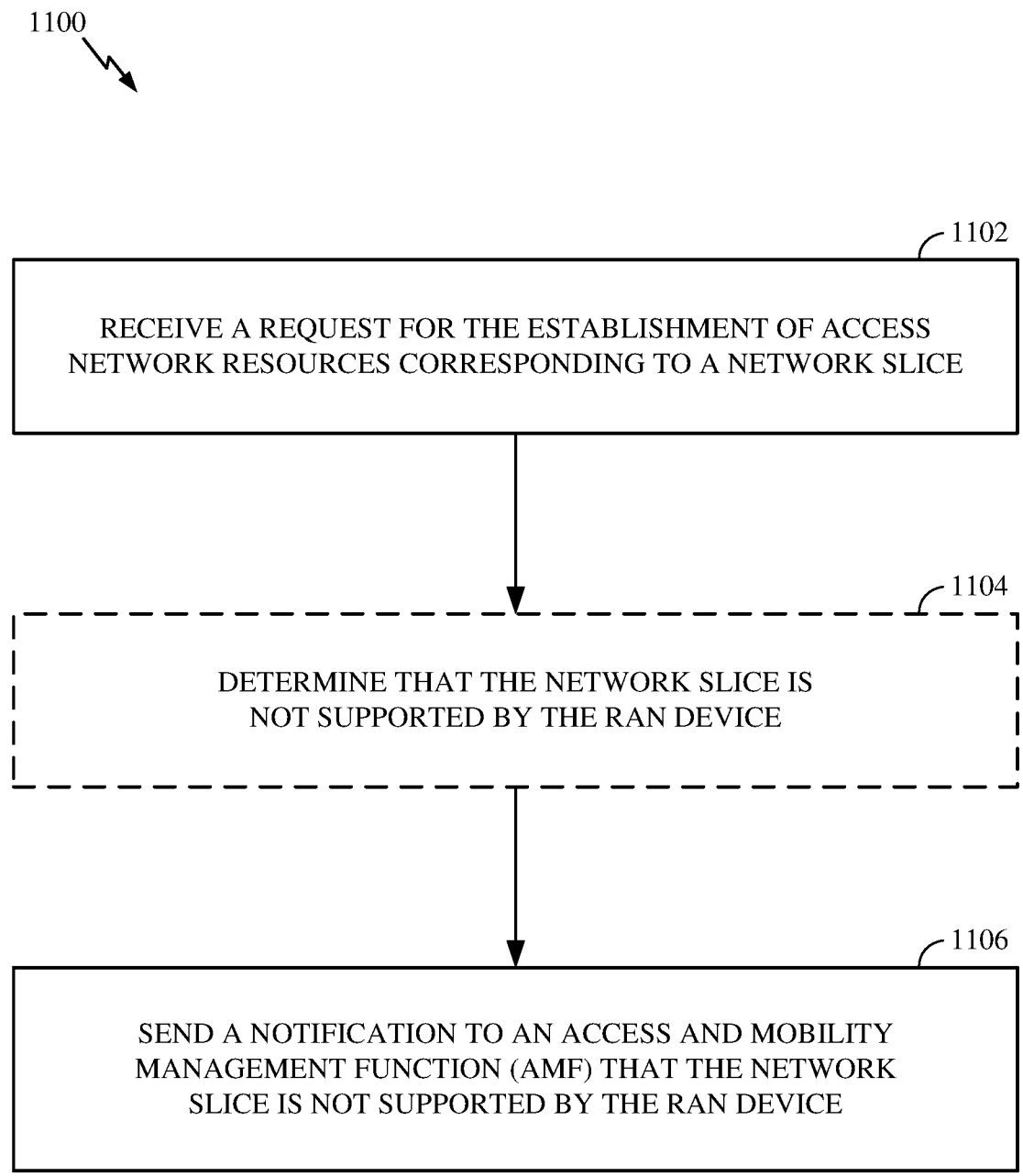
FIG. 11 illustrates example operations for wireless communications, in accordance with certain aspects of the present disclosure.

FIG. 11 illustrates example operations 1100 for wireless communications, in accordance with aspects of the present disclosure. Operations 1100 may be performed by a radio access network (RAN) device of a network, such as BS 110 shown in FIG. 1, and/or a DU, such as DU 306 shown in FIG. 3.

Operations 1100 begin, at block 1102, with the RAN device receiving a request for the establishment of access network resources corresponding to a network slice.

At block 1104, operations 1100 may optionally continue with the RAN device determining that the network slice is not supported by the RAN device. Block 1104 is outlined with dashed lines to indicate that this block is optional to operations 1100.

Operations 1100 continue at block 1106 with the RAN device sending a notification to an access and mobility management function (AMF) that the network slice is not supported by the RAN device.

According to aspects of the present disclosure, the determination that the network slice is not supported by the RAN device may be based on a request from a mobility management function for resources for a protocol data unit (PDU) session of the network slice.

In aspects of the present disclosure, the determination that the network slice is not supported by the RAN device may be based on a request from another RAN device.

According to aspects of the present disclosure, the RAN device may receive the request in block 1102 from another RAN device, a protocol data unit (PDU) session may correspond to the network slice, and the RAN device may send to the other RAN device a list of PDU sessions, including an identifier of the PDU session, that the RAN device has not setup. The RAN device may also send an indication of a reason that the PDU session is not setup to the other RAN device.

Figure 12:
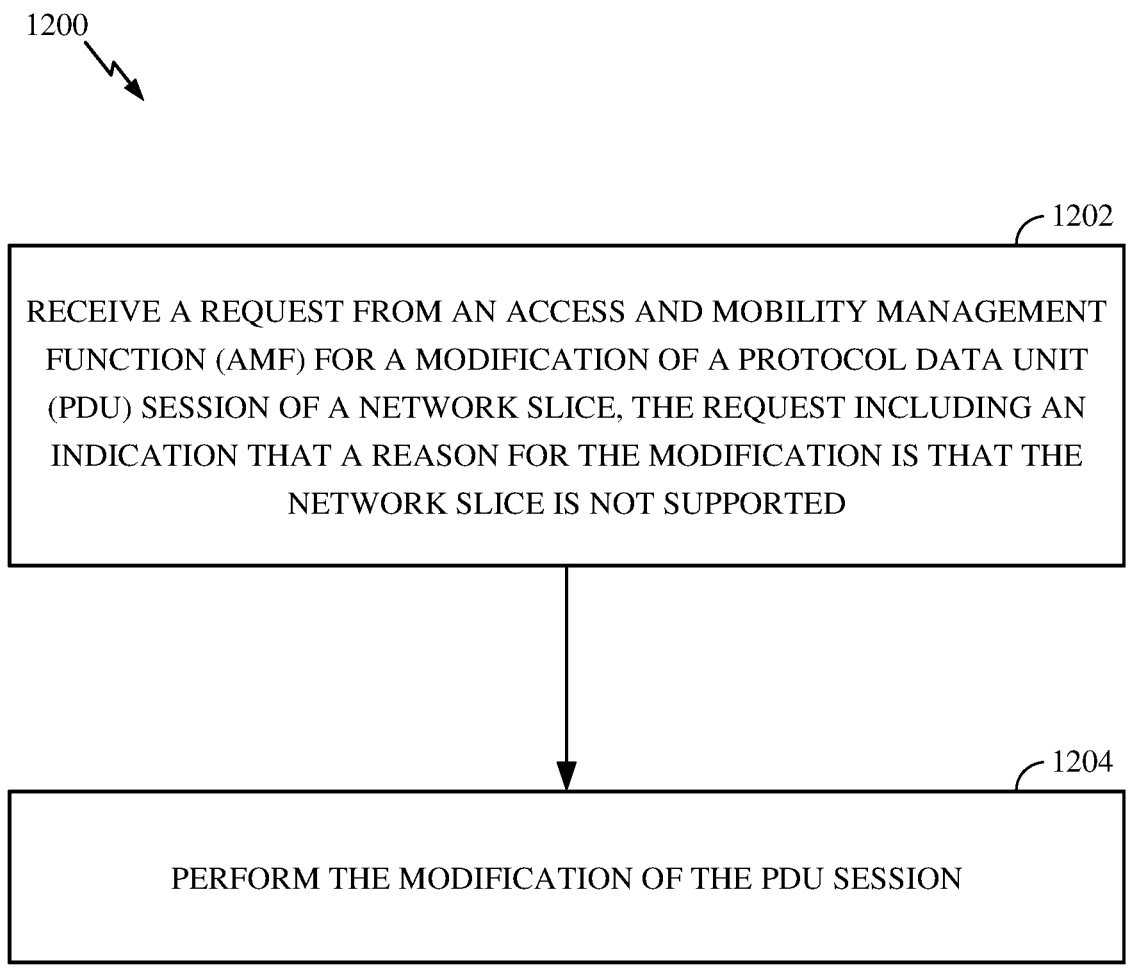
FIG. 12 illustrates example operations for wireless communications, in accordance with certain aspects of the present disclosure.

FIG. 12 illustrates example operations 1200 for wireless communications, in accordance with aspects of the present disclosure. Operations 1200 may be performed by a service management function (SMF), such as SMF 226 shown in FIGS. 2A-2D.

Operations 1200 begin, at block 1202, with the SMF receiving a request from an access and mobility management function (AMF) for a modification of a protocol data unit (PDU) session of a network slice, the request including an indication that a reason for the modification is that the network slice is not supported.

At block 1204, operations 1200 continue with the SMF performing the modification of the PDU session.

According to aspects of the present disclosure, the modification of the PDU session may comprise disconnecting the PDU session.

In aspects of the present disclosure, the modification of the PDU session may comprise releasing user plane resources of the PDU session.

According to aspects of the present disclosure, the indication of the reason for the modification may further indicate an identity of the network slice (e.g., a network slice identifier).

In aspects of the present disclosure, the SMF may send, to the UE, an indication of the reason for the modification based on the indication received from the AMF.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, the instructions may include instructions for performing the operations described herein and illustrated in FIGS. 8-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, the apparatus comprising:
at least one processor; and
memory coupled with the at least one processor:
the at least one processor and memory configured to:
receive a first indication that a network slice is not available;
enter a connection management idle (CM-IDLE) state in response to the first indication;
initiate a registration procedure with an access and mobility management function (AMF) subsequent to entering the CM-IDLE state; and
obtain a second indication from the AMF requesting the apparatus to provide a permanent identity of the apparatus in one or more future mobility management procedures.

2. The apparatus of claim 1, wherein obtaining the second indication from the AMF requesting the apparatus to provide the permanent identity includes:
obtaining a third indication from the AMF that a current temporary identifier of the apparatus is invalid.

3. The apparatus of claim 2, wherein the at least one processor and memory are further configured to:
remove the current temporary identifier from a configuration of the apparatus, based on the third indication.

4. The apparatus of claim 1, wherein the at least one processor and memory being configured to initiate the registration procedure comprises the at least one processor and memory being configured to:
transmit a registration request message comprising a subscription permanent identifier (SUPI) or a security protected version of the SUPI of the apparatus.

5. The apparatus of claim 1, wherein receiving the first indication comprises receiving a request from the AMF to re-register with a network.

6. An apparatus for wireless communications, the apparatus comprising:
means for receiving a first indication that a network slice is not available;
means for entering a connection management idle (CM-IDLE) state in response to the first indication;
means for initiating a registration procedure with an access and mobility management function (AMF) subsequent to entering the CM-IDLE state; and
means for obtaining a second indication from the AMF requesting the apparatus to provide a permanent identity of the apparatus one or more in future mobility management procedures.

7. The apparatus of claim 6, wherein the means for obtaining the second indication from the AMF requesting the apparatus to provide the permanent identity includes:
means for obtaining a third indication from the AMF that a current temporary identifier of the apparatus is invalid.

8. The apparatus of claim 7, further comprising:
means for removing the current temporary identifier from a configuration of the apparatus, based on the third indication.

9. The apparatus of claim 6, wherein the means for initiating the registration procedure comprises:

means for transmitting a registration request message comprising a subscription permanent identifier (SUPI) or a security protected version of the SUPI of the apparatus.

10. The apparatus of claim 6, wherein the means for receiving the first indication comprises means for receiving a request from the AMF to re-register with a network.

11. An apparatus for wireless communications, the apparatus comprising:
   at least one processor; and
   memory coupled with the at least one processor:
   the at least one processor and memory configured to:
      receive a first indication that a network slice is not available;
      enter a connection management idle (CM-IDLE) state in response to the first indication;
      initiate a registration procedure with a network entity subsequent to entering the CM-IDLE state; and
      obtain a second indication from the network entity requesting the apparatus to provide a permanent identity of the apparatus in one or more future mobility management procedures.

12. The apparatus of claim 11, wherein obtaining the second indication from the network entity requesting the apparatus to provide the permanent identity includes:
   obtaining a third indication from the network entity that a current temporary identifier of the apparatus is invalid.

13. The apparatus of claim 12, wherein the at least one processor and memory are further configured to:
   remove the current temporary identifier from a configuration of the apparatus, based on the third indication.

14. The apparatus of claim 11, wherein the at least one processor and memory being configured to initiate the registration procedure comprises the at least one processor and memory being configured to:
   transmit a registration request message comprising a subscription permanent identifier (SUPI) or a security protected version of the SUPI of the apparatus.

15. The apparatus of claim 11, wherein receiving the first indication comprises receiving a request from the network entity to re-register with a network.

16. A method for wireless communications, the method comprising:
   by a user equipment:
      receiving a first indication that a network slice is not available;
      entering a connection management idle (CM-IDLE) state in response to the first indication;
      initiating a registration procedure with a network entity subsequent to entering the CM-IDLE state; and
      obtaining a second indication from the network entity requesting the user equipment to provide a permanent identity of the user equipment in one or more future mobility management procedures.

17. The method of claim 16, wherein obtaining the second indication from the network entity requesting the user equipment to provide the permanent identity includes:
   obtaining a third indication from the network entity that a current temporary identifier of the user equipment is invalid.

18. The method of claim 17, further comprising:
   removing the current temporary identifier from a configuration of the user equipment, based on the third indication.

19. The method of claim 16, wherein initiating the registration procedure comprises:
   transmitting a registration request message comprising a subscription permanent identifier (SUPI) or a security protected version of the SUPI of the user equipment.

20. The method of claim 16, wherein receiving the first indication comprises receiving a request from the network entity to re-register with a network.

21. An apparatus for wireless communications, the apparatus comprising:
   at least one processor; and
   memory coupled with the at least one processor:
   the at least one processor and memory configured to:
      detect that a network slice, with which a user equipment (UE) has at least one active protocol data unit (PDU) session corresponding to that network slice, has or will become unavailable;
      send a request to a session management function (SMF) for a modification of the PDU session, in response to a detection that the network slice has or will become unavailable; and
      send, to the UE, an indication that a re-registration of the UE is required and that a current temporary identifier of the UE is invalid.

22. The apparatus of claim 21, wherein the at least one processor and memory are further configured to:
   send, to the UE, a new allowed network slice selection assistance information (NSSAI) comprising a network slice instance (NSI) identifier (NSI ID) identifying the network slice with which the UE had the active PDU session.

23. The apparatus of claim 21, wherein the at least one processor and memory are further configured to:
   receive a registration request message from the UE.

24. The apparatus of claim 23, wherein the at least one processor and memory are further configured to:
   send, to a service management function (SMF), another indication to release the PDU session.

25. The apparatus of claim 21, wherein the at least one processor and memory are further configured to:
   send, to a service management function (SMF), another indication to release the PDU session.

26. The apparatus of claim 21, wherein the at least one processor and memory are configured to detect that the network slice has or will become unavailable based on another indication, received by the apparatus, from a radio access network (RAN) entity communicating with the UE.

27. The apparatus of claim 21, wherein the at least one processor and memory are configured to detect that the network slice has or will become unavailable based on a message received by the apparatus from the UE.

28. The apparatus of claim 21, wherein the at least one processor and memory are configured to send, to the UE, an indication that the network slice is not available or will become unavailable.

29. An apparatus for wireless communications, the apparatus comprising:
   means for detecting that a network slice, with which a user equipment (UE) has at least one active protocol data unit (PDU) session corresponding to that network slice, has or will become unavailable;
   means for sending a request to a session management function (SMF) for a modification of the PDU session, in response to a detection that the network slice has or will become unavailable; and
   means for sending, to the UE, an indication that a re-registration of the UE is required and that a current temporary identifier of the UE is invalid.

30. The apparatus of claim 29, further comprising:
means for sending, to the UE, a new allowed network slice selection assistance information (NSSAI) comprising a network slice instance (NSI) identifier (NSI ID) identifying the network slice with which the UE had the active PDU session.

31. The apparatus of claim 29, further comprising:
means for receiving a registration request message from the UE.

32. The apparatus of claim 31, further comprising:
means for sending, to a service management function (SMF), another indication to release the PDU session.

33. The apparatus of claim 29, further comprising:
means for sending, to a service management function (SMF), another indication to release the PDU session.

34. The apparatus of claim 29, wherein the means for detecting comprises means for detecting, based on another indication, received by the apparatus, from a radio access network (RAN) entity communicating with the UE.

35. The apparatus of claim 29, wherein the means for detecting comprises means for detecting, based on a message received by the apparatus from the UE.

36. The apparatus of claim 29, wherein the means for sending the indication comprises means for sending an indication that the network slice is not available or will become unavailable.

* * * * *